United States Patent
Azuma et al.

(10) Patent No.: US 9,540,720 B2
(45) Date of Patent: Jan. 10, 2017

(54) HIGH-STRENGTH HOT-DIP GALVANIZED STEEL SHEET AND HIGH-STRENGTH ALLOYED HOT-DIP GALVANIZED STEEL SHEET HAVING EXCELLENT FORMABILITY AND SMALL MATERIAL ANISOTROPY WITH ULTIMATE TENSILE STRENGTH OF 980 MPA OR MORE

(71) Applicant: Nippon Steel & Sumitomo Metal Corporation, Tokyo (JP)

(72) Inventors: Masafumi Azuma, Tokyo (JP); Chisato Wakabayashi, Tokyo (JP); Takayuki Nozaki, Tokyo (JP); Nobuhiro Fujita, Tokyo (JP); Manabu Takahashi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 311 days.

(21) Appl. No.: 14/347,269

(22) PCT Filed: Sep. 28, 2012

(86) PCT No.: PCT/JP2012/075214
§ 371 (c)(1),
(2) Date: Mar. 26, 2014

(87) PCT Pub. No.: WO2013/047819
PCT Pub. Date: Apr. 4, 2013

(65) Prior Publication Data
US 2014/0242415 A1    Aug. 28, 2014

(30) Foreign Application Priority Data
Sep. 30, 2011   (JP) .................................. 2011-218040

(51) Int. Cl.
*C23C 2/02*    (2006.01)
*C21D 8/02*    (2006.01)
(Continued)

(52) U.S. Cl.
CPC .............. *C23C 2/02* (2013.01); *B32B 15/013* (2013.01); *C21D 8/0226* (2013.01);
(Continued)

(58) Field of Classification Search
CPC ................ C23C 2/06; C23C 2/04; C23C 2/28; C23C 30/00; C23C 30/005; C23C 28/023; C23C 2/02; C23C 2/12; C23C 28/021; Y10T 428/12799; Y10T 428/12792; Y10T 428/12757; Y10T 428/12958; Y10T 428/12972; B32B 15/013; B32B 15/04; B32B 15/043; B32B 15/18; C22C 18/04; C22C 38/06; C22C 38/001; C22C 18/00; C22C 38/02; C22C 38/04; C22C 38/002; C22C 38/08; C22C 38/12; C22C 38/14; C22C 38/16; C22C 38/40; C22C 38/42; C22C 38/44; C22C 38/46; C22C 38/48; C22C 38/26; C22C 38/28; C22C 38/32; C22C 38/34; C22C 38/38; C22C 38/18; C22C 38/20; C22C 38/22; C22C 38/24; C22C 38/50; C22C 38/54; C22C 38/58
See application file for complete search history.

(56) References Cited

U.S. PATENT DOCUMENTS 7,503,984 B2   3/2009   Yokoi et al.
2004/0244877 A1   12/2004   Yokoi
(Continued)

FOREIGN PATENT DOCUMENTS

EP   2692895   5/2014
JP   4-26720   1/1992
(Continued)

OTHER PUBLICATIONS

Machine Translation, Yasui et al., JP 2008-163388, Jul. 2008.*
(Continued)

*Primary Examiner* — Michael E La Villa
(74) *Attorney, Agent, or Firm* — Birch, Stewart, Kolasch & Birch, LLP

(57) ABSTRACT

Disclosed is a high-strength hot-dip galvanized steel sheet having small material anisotropy and excellent formability with an ultimate tensile strength of 980 MPa or more. The hot-dip galvanized steel sheet includes a hot-dip galvanized layer formed on a surface of a base steel plate. The base steel plate contains C, Si, Mn, O, P, S, Al and N within predetermined ranges and a balance including Fe and inevitable impurities. The hot-dip galvanized layer contains Fe at less
(Continued)

than 7 mass % or 7 to 15 mass % and a balance including Zn, Al, and inevitable impurities.

6 Claims, 2 Drawing Sheets

(51) Int. Cl.

| | |
|---|---|
| C23C 28/02 | (2006.01) |
| C23C 2/04 | (2006.01) |
| C23C 30/00 | (2006.01) |
| C23C 2/06 | (2006.01) |
| C23C 2/12 | (2006.01) |
| C23C 2/28 | (2006.01) |
| C22C 18/04 | (2006.01) |
| C22C 38/06 | (2006.01) |
| B32B 15/01 | (2006.01) |
| C22C 38/00 | (2006.01) |
| C22C 38/02 | (2006.01) |
| C22C 38/04 | (2006.01) |
| C22C 18/00 | (2006.01) |
| C22C 38/08 | (2006.01) |
| C22C 38/12 | (2006.01) |
| C22C 38/14 | (2006.01) |
| C22C 38/16 | (2006.01) |
| C22C 38/26 | (2006.01) |
| C22C 38/28 | (2006.01) |
| C22C 38/32 | (2006.01) |
| C22C 38/34 | (2006.01) |
| C22C 38/38 | (2006.01) |
| C21D 9/46 | (2006.01) |

(52) U.S. Cl.
CPC ......... *C21D 8/0236* (2013.01); *C21D 8/0273* (2013.01); *C22C 18/00* (2013.01); *C22C 18/04* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/26* (2013.01); *C22C 38/28* (2013.01); *C22C 38/32* (2013.01); *C22C 38/34* (2013.01); *C22C 38/38* (2013.01); *C23C 2/04* (2013.01); *C23C 2/06* (2013.01); *C23C 2/12* (2013.01); *C23C 2/28* (2013.01); *C23C 28/021* (2013.01); *C23C 28/023* (2013.01); *C23C 30/00* (2013.01); *C23C 30/005* (2013.01); *C21D 8/0263* (2013.01); *C21D 8/0278* (2013.01); *C21D 9/46* (2013.01); *C21D 2211/001* (2013.01); *C21D 2211/005* (2013.01); *Y10T 428/12757* (2015.01); *Y10T 428/12792* (2015.01); *Y10T 428/12799* (2015.01); *Y10T 428/12958* (2015.01); *Y10T 428/12972* (2015.01)

(56) References Cited

U.S. PATENT DOCUMENTS

| | | | |
|---|---|---|---|
| 2008/0000555 | A1 | 1/2008 | Nonaka et al. |
| 2013/0037180 | A1* | 2/2013 | Sano ............... C21D 8/0436 148/603 |
| 2014/0000765 | A1* | 1/2014 | Nozaki ............ C21D 8/0226 148/504 |
| 2014/0014236 | A1* | 1/2014 | Nozaki ............ C21D 8/0226 148/504 |
| 2014/0044989 | A1* | 2/2014 | Toda ................ C23C 2/02 428/659 |

FOREIGN PATENT DOCUMENTS

| | | |
|---|---|---|
| JP | 3521851 | 2/2004 |
| JP | 3598087 | 9/2004 |
| JP | 2004-315960 | 11/2004 |
| JP | 2004-323970 | 11/2004 |
| JP | 2006193819 | 7/2006 |
| JP | 2007-277661 | 10/2007 |
| JP | 2007-284776 | 11/2007 |
| JP | 2008-163388 | 7/2008 |
| JP | 2008-214752 | 9/2008 |
| JP | 2009-030159 | 2/2009 |
| JP | 2011-111674 | 6/2011 |
| TW | 236503 | 7/2005 |
| TW | 200615387 | 5/2006 |
| WO | 2011/093319 | 8/2011 |

OTHER PUBLICATIONS

European Search Report dated Oct. 9, 2015 issued in corresponding European Patent Application No. 12836248.0.
F. Ajersch et al., Simulation of flow in a continuous galvanizing bath: Part I. Thermal effects of ingot addition. Metallurgical and Materials Transactions, vol. 35B, Feb. 2004, pp. 161-170.
International Search Report dated Jan. 8, 2013 issued in corresponding PCT Application No. PCT/JP2012/075214 [with English Translation].
Office Action dated Sep. 17, 2014 issued in corresponding Taiwanese Application No. 101135879.

* cited by examiner

HIGH-STRENGTH HOT-DIP GALVANIZED STEEL SHEET AND HIGH-STRENGTH ALLOYED HOT-DIP GALVANIZED STEEL SHEET HAVING EXCELLENT FORMABILITY AND SMALL MATERIAL ANISOTROPY WITH ULTIMATE TENSILE STRENGTH OF 980 MPA OR MORE

TECHNICAL FIELD

The present invention relates to a high-strength plated steel sheet and a high-strength alloyed hot-dip galvanized steel sheet having excellent plating adhesion and formability with an ultimate tensile strength (TS) of 980 MPa or more which is particularly suitable for a structural member, a reinforcing member, and a suspension member of automobiles.

This application is a national stage application of International Application No. PCT/JP2012/075214, filed Sep. 28, 2012, which claims priority to Japanese Patent Application No. 2011-218040, filed on Sep. 30, 2011, the content of which is incorporated herein by reference.

BACKGROUND ART

Reduction of weight of members such as cross members and side members of automobiles has been considered so as to support trends for reduction of fuel consumption in recent years. In terms of materials, from the viewpoint of securing strength and impact safety even when being thinned, a steel sheet has been made higher in strength. However, the formability of materials deteriorates along with the rise of strength thereof. In order to implement lighter weight of the members, a steel sheet which satisfies both of the press formability and the high strength has to be produced. In particular, excellent ductility is required in the case of forming the structural member or the reinforcing member of automobiles that has a complicated shape.

Recently, as a frame member of the automobile, a steel sheet having ultimate tensile strength of 440 MPa or 590 MPa is mainly used. In order to further reduce the weight, development of a high strength steel sheet of 980 MPa or more is preferred. In particular, when the steel sheet of 590 MPa class is replaced with the steel sheet of 980 MPa class, it requires an elongation equivalent to the 590 MPa class. Thus, development of a steel sheet of 980 MPa or more having excellent elongation is desired.

As the steel sheet having excellent total elongation (El) in a tensile test, there are complex structure steel sheets in which a soft ferrite serving as a primary phase is used in a steel sheet structure to ensure the ductility and a residual austenite is dispersed as a second phase to ensure strength.

As the steel obtained by dispersing the residual austenite, there is a TRIP (TRansformation Induced Plasticity) steel which uses martensite transformation of the residual austenite at the time of plastic processing, and applications thereof has been expanded, recently.

In particular, the TRIP steel has excellent elongation compared with precipitation strengthened steel and DP steel (steel consisting of ferrite and martensite), and thus expanded application is highly desirable. However, since this steel ensures excellent formability using martensite transformation at the time of forming, large amounts of residual austenite are required to ensure the formability. In order to ensure the residual austenite, it is required to add large amounts of Si. Further, in order to ensure the strength of 980 MPa or more, there is a tendency that alloy elements are added in large amounts and a texture easily develops. In particular, the development of the texture of orientation groups {100} <011> to {223} <110> or the texture of an orientation {332} <113> promotes a material anisotropy. For example, as compared with the total elongation in the case of performing the tensile test on a steel strip in a direction parallel to a rolling direction, the total elongation in the case of performing the tensile test in a vertical direction is greatly inferior. Consequently, even though the steel sheet has characteristics of a good elongation in one direction and an excellent formability, it is difficult to apply to a member having a complicated shape.

On the other hand, hot-dip galvanized steel sheet and alloyed hot-dip galvanized steel sheet having excellent corrosion resistance has been known as a steel sheet for automobile. The steel sheet is provided with a plated layer made of a zinc containing Fe of 15% or less on a surface of the steel sheet to have the excellent corrosion resistance. The hot-dip galvanized steel sheet and the alloyed hot-dip galvanized steel sheet are manufactured in a continuous-type hot-dip galvanizing line (hereinafter, referred to as a CGL) in many cases. In the CGL, the steel sheet is degreased, then is annealed by an indirect heating with radiant tubes under a reducing atmosphere which contains $H_2$ and $N_2$, then is cooled to near a temperature of a galvanizing bath, and then is dipped in a hot-dip galvanizing bath. Thereafter, the steel sheet is subjected to a plating treatment.

In the case of manufacturing the alloyed hot-dip galvanized steel sheet, the steel sheet is dipped in the galvanizing bath and is then re-heated, so that the galvanized layer is subjected to an alloying treatment. At this time, an in-furnace atmosphere is an atmosphere at which Fe is reduced, and the steel sheet can be manufactured without oxidizing Fe, so that it is widely used as a manufacturing facility of a galvanized steel sheet.

However, Si is easily oxidized compared with Fe, and Si oxide is formed on the surface of the steel sheet while passing through the CGL. The Si oxide is responsible for galvanizing faults due to poor wettability with the hot-dip galvanizing. Alternatively, since the oxide inhibits an alloying reaction of Fe and zinc, there has a problem in that the alloyed hot-dip galvanized steel sheet cannot be manufactured.

With respect to this problem, a method of achieving both of the excellent formability and a plating property, in particular, a means of improving the plating property of steel containing Si in large amounts is disclosed in Patent Literature 1 in which annealing is performed once, then pickling is performed to remove the oxide on the surface of the steel sheet, and then the hot-dip galvanizing treatment is performed once again. However, this method is undesirable in that the annealing of two times is performed, and thus the pickling after heat treatment and a passage of the galvanizing line leads to a significant increase of processes and an increase of cost.

As the means of improving the plating property of the steel containing Si, a method of suppressing oxides of Si or Mn by making in-furnace atmosphere to be a reducing atmosphere of easily oxidizable elements such as Si and Mn or a method of reducing the formed oxides is disclosed in Patent Literature 2. In this method, pre-plating or surface grinding is performed on materials having a poor plating property prior to entering the galvanizing line. However, as a process of the pre-plating or the surface grinding increases, the cost increases. In addition, since the high strength steel sheet generally contains Si and Mn in large amounts, it is difficult to achieve an atmosphere capable of reducing Si in the steel sheet containing Si of 0.5 wt % or more which is a target of the present invention, and thus huge facility investment is required, resulting in increasing the cost. In addition, since oxygen released from the reduced oxides of Si and Mn changes the in-furnace atmosphere into an oxidizing atmosphere of Si, it is difficult to stabilize the atmosphere in the case of performing massive production. As a result, there is a concern in that defects such as unevenness of plating wettability or alloying unevenness occur in a longitudinal direction or a width direction of the steel sheet.

As a means of achieving both of the excellent ductility and a plating property, Patent Literature 3 discloses a method in which cold-rolling is performed, then the surface of the steel sheet is subjected to a pre-plating treatment with metals such as Ni, Fe, or Co and is subjected to a plating treatment while passing through a heat-treatment line. This relates to a method of pre-plating metals, which are difficult to oxidize compared with Si and Mn, on a surface layer of the steel sheet and manufacturing the steel sheet not containing Si and Mn on the surface layer of the steel sheet. However, even when the surface of the steel sheet is subjected to the pre-plating treatment, these elements diffuse into the inside of the steel sheet during the heat treatment, and thus a large amount of pre-plating should be performed. Therefore, there is a problem in that the cost remarkably increases.

As a means of solving these problems, Patent Literatures 4 to 6 propose a method in which Si oxide is not formed on the surface of the steel sheet but is formed inside the steel sheet. This can increase oxygen potential in the furnace and can oxidize Si inside the steel sheet to suppress diffusion of Si into the surface of the steel sheet and formation of the Si oxide on the surface.

In addition, Patent Literatures 7 and 8 do not relate to TRIP steel but to galvanized steel sheet and disclose a method of setting the inside of the furnace to be the reducing atmosphere at an annealing process of CGL. Moreover, Patent Literature 9 discloses a method of providing a jet flow of a predetermined flow rate in a galvanizing bath to prevent galvanizing faults by scum.

However, the conventional techniques are extremely difficult to simultaneously provide the corrosion resistance, the high strength, and the ductility.

PRIOR ART LITERATURE(S)

Patent Literature(s)

[Patent Literature 1] JP 3521851B
[Patent Literature 2] JP 4-26720A
[Patent Literature 3] JP 3598087B
[Patent Literature 4] JP 2004-323970A
[Patent Literature 5] JP 2004-315960A
[Patent Literature 6] JP 2008-214752A
[Patent Literature 7] JP 2011-111674A
[Patent Literature 8] JP 2009-030159A
[Patent Literature 9] JP 2008-163388A

SUMMARY OF THE INVENTION

Problem(S) to be Solved by the Invention

The present invention is to provide a high-strength hot-dip galvanized steel sheet and a high-strength alloyed hot-dip galvanized steel sheet having excellent plating adhesion and formability with ultimate tensile strength (TS) of 980 MPa or more.

Means for Solving the Problem(s)

From the result obtained by an earnest examination, in order to achieve both of the ultimate tensile strength (TS) of 980 MPa or more and the excellent formability, the present inventors have found that it is important to fully utilize Si as a strengthening element and to contain ferrite of 40% or more by volume fraction and a residual austenite of 8% or more by volume fraction. In addition, the inventors have found that even in a cold-rolled steel sheet containing a large amount of additive elements, it is possible to manufacture a steel sheet, in which anisotropy of a material is reduced and the formability is excellent, by controlling rough rolling and finishing rolling within a specific range.

On the other hand, the plating property and alloying of the steel containing a large amount of Si were ensured by allowing the molten zinc to flow in a galvanizing bath at 10 to 50 m/min and suppressing a reaction between zinc oxide (scum) and the steel sheet which is responsible for galvanizing faults. In the case where the flow does not occur in the bath, a fine zinc oxide is incorporated into a galvanized layer and the alloying reaction is inhibited.

In addition, the detailed mechanism is unclear, but when oxides of Si and Mn exist in the surface of the steel sheet, the galvanizing faults due to the zinc oxide and the alloying delay become more remarkable to have significantly an adverse influence on the plating property. The suppression of the reaction between the scum and the steel sheet which is responsible for the galvanizing faults and the alloying delay also has a significant effect in facilitating the alloying process.

By the improvement of the plating property, it is possible to add a large amount of Si to the hot-dip galvanized steel sheet and the alloyed hot-dip galvanized steel sheet.

The present invention relates to a high-strength hot-dip galvanized steel sheet and a high-strength alloyed hot-dip galvanized steel sheet having small material anisotropy and excellent formability with the ultimate tensile strength (TS) of 980 MPa or more and the gist thereof is as follows.

[1] A high-strength hot-dip galvanized steel sheet having small material anisotropy and excellent formability with an ultimate tensile strength of 980 MPa or more, the hot-dip galvanized steel sheet comprising a hot-dip galvanized layer formed on a surface of a base steel sheet,
wherein the base steel sheet contains: by mass %,
C: 0.1 to less than 0.40%;
Si: 0.5 to 3.0%;
Mn: 1.5 to 3.0%;
O: limited to 0.006% or less;
P: limited to 0.04% or less;
S: limited to 0.01% or less;
Al: limited to 2.0% or less;
N: limited to 0.01% or less; and
a balance including Fe and inevitable impurities,
a microstructure of the base steel sheet contains ferrite of 40% or more, residual austenite of 8 to less than 60%, by volume fraction, and a balance being bainite or martensite,
an average value of pole densities of orientation groups {100} <011> to {223} <110> represented by each of crystal orientations {100} <011>, {116} <110>, {114} <110>, {113} <110>, {112} <110>, {335} <110>, and {223} <110> in a sheet thickness range of ⅝ to ⅜ from the surface of the base steel sheet is 6.5 or less and a pole density of a crystal orientation {332} <113> is 5.0 or less, and the hot-dip galvanized layer contains Fe: less than 7 mass % and a balance including Zn, Al, and inevitable impurities.

[2] The high-strength hot-dip galvanized steel sheet having the small material anisotropy and the excellent formability with the ultimate tensile strength of 980 MPa or more according to [1], wherein the base steel sheet further contains one or two or more of: by mass %, Cr: 0.05 to 1.0%;
Mo: 0.01 to 1.0%;
Ni: 0.05 to 1.0%;
Cu: 0.05 to 1.0%;
Nb: 0.005 to 0.3%;
Ti: 0.005 to 0.3%;
V: 0.005 to 0.5%; and
B: 0.0001 to 0.01%.

[3] The high-strength hot-dip galvanized steel sheet having the small material anisotropy and the excellent formability with the ultimate tensile strength of 980 MPa or more according to [1], wherein the base steel sheet further contains, by mass %, 0.0005 to 0.04% in total of one or two or more selected from Ca, Mg, and REM.

[4] A high-strength hot-dip alloyed galvanized steel sheet having small material anisotropy and excellent formability with an ultimate tensile strength of 980 MPa or more, the alloyed hot-dip galvanized steel sheet comprising an alloyed hot-dip galvanized layer formed on a surface of a base steel sheet, wherein the base steel sheet contains: by mass %,
C: 0.10 to less than 0.4%;
Si: 0.5 to 3.0%;
Mn: 1.5 to 3.0%;
O: limited to 0.006% or less;
P: limited to 0.04% or less;
S: limited to 0.01% or less;
Al: limited to 2.0% or less;
N: limited to 0.01% or less; and
a balance including Fe and inevitable impurities, a microstructure of the base steel sheet contains ferrite of 40% or more, residual austenite of 8 to less than 60%, by volume fraction, and a balance being bainite or martensite, an average value of pole densities of orientation groups {100} <011> to {223} <110> represented by each of crystal orientations {100} <011>, {116} <110>, {114} <110>, {113} <110>, {112} <110>, {335} <110>, and {223} <110> in a sheet thickness range of ⅝ to ⅜ from the surface of the base steel sheet is 6.5 or less and a pole density of a crystal orientation {332} <113> is 5.0 or less, and the alloyed hot-dip galvanized layer contains Fe: 7 to 15 mass % and a balance including Zn, Al, and inevitable impurities.

[5] The high-strength alloyed hot-dip galvanized steel sheet having the small material anisotropy and the excellent formability with the ultimate tensile strength of 980 MPa or more according to [4], wherein the base steel sheet further contains one or two or more of: by mass %, Cr: 0.05 to 1.0%;
Mo: 0.01 to 1.0%;
Ni: 0.05 to 1.0%;
Cu: 0.05 to 1.0%;
Nb: 0.005 to 0.3%;
Ti: 0.005 to 0.3%;
V: 0.005 to 0.5%; and
B: 0.0001 to 0.01%.

[6] The high-strength alloyed hot-dip galvanized steel sheet having the small material anisotropy and the excellent formability with the ultimate tensile strength of 980 MPa or more according to [4], wherein the base steel sheet further contains, by mass %, 0.0005 to 0.04% in total of one or two or more selected from Ca, Mg, and REM.

[7] A manufacturing method of a high-strength hot-dip galvanized steel sheet having small material anisotropy and excellent formability with an ultimate tensile strength of 980 MPa or more, the manufacturing method comprising:

with respect to a steel billet containing: by mass %,
C: 0.10 to less than 0.4%;
Si: 0.5 to 3.0%;
Mn: 1.5 to 3.0%;
O: limited to 0.006% or less;
P: limited to 0.04% or less;
S: limited to 0.01% or less;
Al: limited to 2.0% or less;
N: limited to 0.01% or less; and
a balance including Fe and inevitable impurities, performing first hot rolling in which rolling at a reduction ratio of 40% or more is carried out one time or more at a temperature range of 1000° C. or higher and 1200° C. or lower;

setting an austenite grain diameter to 200 μm or less by the first hot rolling;

performing second hot rolling in which rolling at a reduction ratio of 30% or more is carried out in one pass at least one time at a temperature region of T1+30° C. or higher and T1+200° C. or lower determined by Expression (1) below;

setting a total reduction ratio in the second hot rolling to 50% or more;

performing a final reduction at a reduction ratio of 30% or more in the second hot rolling and then starting cooling before cold rolling in such a manner that a waiting time t (second) satisfies Expression (2) below;

setting an average cooling rate to 50° C./second or more and a temperature change to be in a range of 40° C. or higher and 140° C. or lower in the cooling before cold rolling;

coiling at a temperature region of 700° C. or lower;

performing cold rolling at a reduction ratio of 40% or more and 80% or less;

heating to an annealing temperature of 750° C. or higher and 900° C. or lower and then annealing in a continuous hot-dip galvanizing line;

cooling to 500° C. from the annealing temperature at 0.1 to 200° C./second; and performing hot-dip galvanizing after holding for 10 to 1000 seconds between 500 and 350° C., $$T1(° C.) = 850 + 10 \times (C+N) \times Mn + 350 \times Nb + 250 \times Ti + 40 \times B + 10 \times Cr + 100 \times Mo + 100 \times V \quad \text{Expression (1)}$$

where, C, N, Mn, Nb, Ti, B, Cr, Mo, and V each represent the content of each element (mass %, Ti, B, Cr, Mo, and V are calculated as zero when not being contained).

$$t \leq 2.5 \times t1 \quad \text{Expression (2)}$$

where, t1 is obtained by Expression (3) below.

$$t = 0.001 \times ((Tf-T1) \times P1/100)^2 - 0.109 \times ((Tf-T1) \times P1/100) + 3.1 \quad \text{Expression (3)}$$

where, in Expression (3) above, Tf represents a temperature of the steel billet obtained after a final reduction at a reduction ratio of 30% or more, and P1 represents a reduction ratio of a final reduction at 30% or more.

[8] The manufacturing method of the high-strength hot-dip galvanized steel sheet having the small material anisotropy and the excellent formability with the ultimate tensile strength of 980 MPa or more according to [7], wherein the total reduction ratio in a temperature range below T1+30° C. is 30% or less.

[9] The manufacturing method of the high-strength hot-dip galvanized steel sheet having the small material anisotropy and the excellent formability with the ultimate tensile strength of 980 MPa or more according to [7], wherein, in a case of heating to the annealing temperature in the continuous hot-dip galvanizing line, an average heating rate of room temperature or higher and 650° C. or lower is set to HR1 (° C./second) expressed by Expression (4) below, and an average heating rate from a temperature exceeding 650° C. to the annealing temperature is set to HR2 (° C./second) expressed by Expression (5) below.

$$HR1 \geq 0.3 \qquad \text{Expression (4)}$$

$$HR2 \leq 0.5 \times HR1 \qquad \text{Expression (5)}$$

[10] The manufacturing method of the high-strength hot-dip galvanized steel sheet having the small material anisotropy and the excellent formability with the ultimate tensile strength of 980 MPa or more according to [7], wherein when the hot-dip galvanizing is performed, a temperature of a base steel sheet is (temperature of hot-dip galvanizing bath−40)° C. or higher and (temperature of hot-dip galvanizing bath+50)° C. or lower.

[11] The manufacturing method of the high-strength hot-dip galvanized steel sheet having the small material anisotropy and the excellent formability with the ultimate tensile strength of 980 MPa or more according to [7], wherein a flow rate of 10 m/min or faster and 50 m/min or slower is provided in a galvanizing bath when the hot-dip galvanizing is performed.

[12] A manufacturing method of a high-strength alloyed hot-dip galvanized steel sheet having small material anisotropy and excellent formability with an ultimate tensile strength of 980 MPa or more, the manufacturing method comprising:

with respect to a steel billet containing: by mass %,
C: 0.10 to less than 0.4%;
Si: 0.5 to 3.0%;
Mn: 1.5 to 3.0%;
O: limited to 0.006% or less;
P: limited to 0.04% or less;
S: limited to 0.01% or less;
Al: limited to 2.0% or less;
N: limited to 0.01% or less; and
a balance including Fe and inevitable impurities,
performing first hot rolling in which rolling at a reduction ratio of 40% or more is carried out one time or more at a temperature range of 1000° C. or higher and 1200° C. or lower;
setting an austenite grain diameter to 200 μm or less by the first hot rolling;
performing second hot rolling in which rolling at a reduction ratio of 30% or more is carried out in one pass at least one time at a temperature region of T1+30° C. or higher and T1+200° C. or lower determined by Expression (1) below;
setting a total reduction ratio in the second hot rolling to 50% or more;
performing a final reduction at a reduction ratio of 30% or more in the second hot rolling and then starting cooling before cold rolling in such a manner that a waiting time t (second) satisfies Expression (2) below;
setting an average cooling rate to 50° C./second or more and a temperature change to be in a range of 40° C. or higher and 140° C. or lower in the cooling before cold rolling;
coiling at a temperature region of 700° C. or lower;
performing cold rolling at a reduction ratio of 40% or more and 80% or less;
heating to an annealing temperature of 750° C. or higher and 900° C. or lower and then annealing in a continuous hot-dip galvanizing line;
cooling to 500° C. from the annealing temperature at 0.1 to 200° C./second;
performing hot-dip galvanizing after holding for 10 to 1000 seconds between 500 and 350° C.; and
performing an alloying treatment at a temperature of 460° C. or higher, $$T1(° C.)=850+10\times(C+N)\times Mn+350\times Nb+250\times Ti+40\times B+10\times Cr+100\times Mo+100\times V \qquad \text{Expression (1)}$$

where, C, N, Mn, Nb, Ti, B, Cr, Mo, and V each represent the content of each element (mass %, Ti, B, Cr, Mo, and V are calculated as zero when not being contained).

$$t \leq 2.5 \times t1 \qquad \text{Expression (2)}$$

where, t1 is obtained by Expression (3) below.

$$t=0.001\times((Tf-T1)\times P1/100)^2-0.109\times((Tf-T1)\times P1/100)+3.1 \qquad \text{Expression (3)}$$

where, in Expression (3) above, Tf represents a temperature of the steel billet obtained after a final reduction at a reduction ratio of 30% or more, and P1 represents a reduction ratio of a final reduction at 30% or more.

[13] The manufacturing method of the high-strength alloyed hot-dip galvanized steel sheet having the small material anisotropy and the excellent formability with the ultimate tensile strength of 980 MPa or more according to [12], wherein the total reduction ratio in a temperature range below T1+30° C. is 30% or less.

[14] The manufacturing method of the high-strength alloyed hot-dip galvanized steel sheet having the small material anisotropy and the excellent formability with the ultimate tensile strength of 980 MPa or more according to [12], wherein, in a case of heating to the annealing temperature in the continuous hot-dip galvanizing line, an average heating rate of room temperature or higher and 650° C. or lower is set to HR1 (° C./second) expressed by Expression (4) below, and an average heating rate from a temperature exceeding 650° C. to the annealing temperature is set to HR2 (° C./second) expressed by Expression (5) below.

$$HR1 \geq 0.3 \qquad \text{Expression (4)}$$

$$HR2 \leq 0.5 \times HR1 \qquad \text{Expression (5)}$$

[15] The manufacturing method of the high-strength alloyed hot-dip galvanized steel sheet having the small material anisotropy and the excellent formability with the ultimate tensile strength of 980 MPa or more according to [12], wherein when the hot-dip galvanizing is performed, a temperature of a base steel sheet is (temperature of hot-dip galvanizing bath−40)° C. or higher and (temperature of hot-dip galvanizing bath+50)° C. or lower.

[16] The manufacturing method of the high-strength alloyed hot-dip galvanized steel sheet having the small material anisotropy and the excellent formability with the ultimate tensile strength of 980 MPa or more according to [12], wherein a flow rate of 10 m/min or faster and 50 m/min or slower is provided in a galvanizing bath when the hot-dip galvanizing is performed.

Effect(s) of the Invention

According to the present invention, the high-strength hot-dip galvanized steel sheet and the high-strength alloyed hot-dip galvanized steel sheet having the small material anisotropy and excellent formability with the ultimate tensile strength (TS) of 980 MPa or more, which is suitable for a structural member, a reinforcing member, and a suspension member of automobiles, are provided at a low cost.

BRIEF DESCRIPTION OF THE DRAWING(S)

MODE(S) FOR CARRYING OUT THE INVENTION

From the result obtained by an earnest examination on the hot-dip galvanized steel sheet and the alloyed hot-dip galvanized steel sheet to solve the above problems, the present inventors have found to exhibit the ultimate tensile strength of 980 MPa or more and the excellent formability when the primary phase of a microstructure of the base steel sheet is ferrite and the residual austenite is contained. In addition, the inventors have found that even in the steel sheet containing a large amount of Si and Mn, it is possible to manufacture the cold-rolled steel sheet having the small material anisotropy by controlling the hot-rolled conditions within a specific range. Further, even in the steel sheet containing a large amount of Si, the plating wettability and the alloying are ensured by allowing the molten zinc to flow in the galvanizing bath.

Hereinafter, the present invention will be described in detail.

(Crystal Orientation of Base Steel Sheet)

Figure 1:
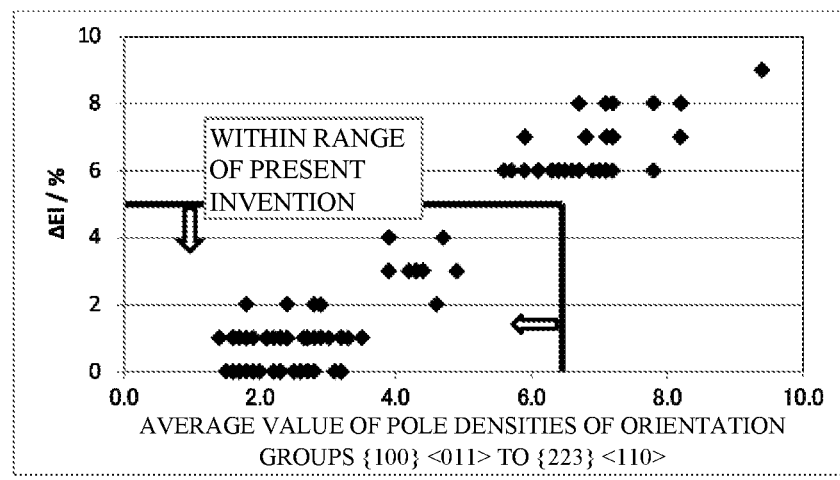
FIG. 1 is a diagram illustrating a relation between ΔEl and an average value of pole densities of orientation groups {100} <011> to {223} <110>.

An average value of pole densities of orientation groups {100} <011> to {223} <110> and a pole density of a crystal orientation {332} <113>, in a sheet thickness range of ⅝ to ⅜ from a surface of a base steel sheet are particularly important characteristic values in the present invention. As illustrated in FIG. 1, in the case of calculating the pole density of each orientation by performing an X-ray diffraction in the sheet thickness range of ⅝ to ⅜ from the surface of the base steel sheet, when the average value of the pole density of the orientation groups {100} <011> to {223} <110> is 6.5 or less, a high strength steel sheet having small material anisotropy and excellent formability is obtained. The average value of the orientation groups {100} <011> to {223} <110> is preferably 4.0 or less.

Orientations included in the orientation groups {100} <011> to {223} <110> are {100} <011>, {116} <110>, {114} <110>, {113} <110>, {112} <110>, {335} <110>, and {223} <110>.

A steel sheet having large material anisotropy means a steel sheet in which ΔEl [=(L−El)−(C−El)], which is defined by a difference between a total elongation (L−El) in the case of performing a tensile test in a direction parallel to a rolling direction and a total elongation (C−El) in the case of performing the tensile test in a direction vertical to the rolling direction, exceeds 5%. A steel sheet containing a large amount of alloying elements has large anisotropy due to the development of texture and has a small C−El in particular. As a result, even though the L−El is excellent, it is difficult to apply such a steel sheet to members to be machined in various directions.

In the present invention, the ΔEl was less than 5%, but even though the difference in the total elongation is less than −5%, the material anisotropy becomes large to deviate from the range of the present invention. However, generally, the above-described range was considered from the fact that the texture develops and the C−El deteriorates. Preferably, the ΔEl is 3% or less.

The pole density is synonymous with an X-ray random intensity ratio. The pole density (X-ray random intensity ratio) is a numerical value obtained by measuring X-ray intensities of a standard sample not having accumulation in a specific orientation and a test sample using an X-ray diffraction method or the like under the same conditions and by dividing the X-ray intensity of the test sample by the X-ray intensity of the standard sample. The pole density is measured using X-ray diffraction, EBSD (Electron Back Scattering Diffraction) or the like. In addition, the pole density can be measured by either an EBSP (Electron Back Scattering Pattern) method or an ECP (Electron Channeling Pattern) method. It may be obtained from a three-dimensional texture calculated by a vector method based on a pole figure of {110} or may be obtained from a three-dimensional texture calculated by a series expansion method using a plurality (preferably, three or more) of pole figures out of pole figures of {110}, {100}, {211}, and {310}.

For example, for the pole density of each of the crystal orientations, each of intensities of (001) [1-10], (116) [1-10], (114) [1-10], (113) [1-10], (112) [1-10], (335) [1-10], and (223) [1-10] at φ2=45° cross-section in the three-dimensional texture (ODF) may be used as it is.

The average value of the pole densities of the orientation groups {100} <011> to {223} <110> is an arithmetic average of the pole density of each orientation. When all of the intensities of these orientations are not obtained, the arithmetic average of the pole density of each orientation {100} <011>, {116} <110>, {114} <110>, {112} <110>, or <110> may be used as a substitute.

Figure 2:
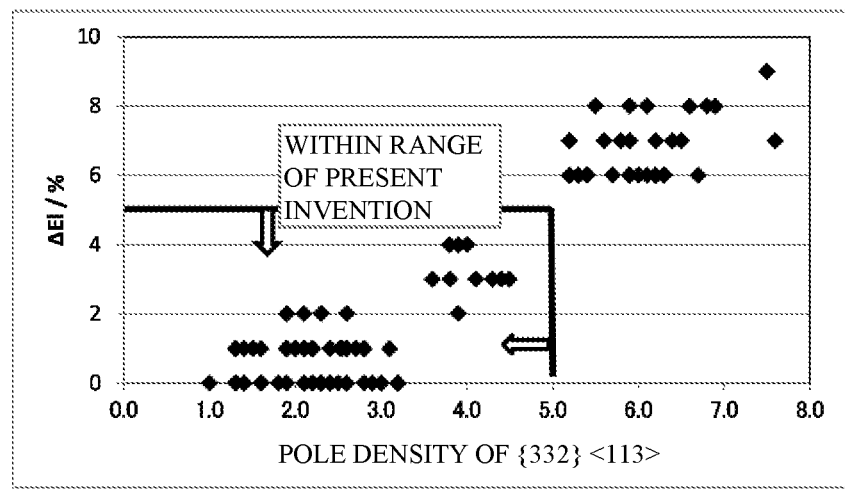
FIG. 2 is a diagram illustrating a relation between ΔEl and a pole density of an orientation {332} <113>.

Similarly, as illustrated in FIG. 2, the pole density of the crystal orientation {332} <113> in the sheet thickness range of ⅝ to ⅜ from the surface of the base steel sheet has to be 5.0 or less. Preferably, the pole density may be 3.0 or less. When the pole density of the crystal orientation {332} <113> is 5.0 or less, the ΔEl is 5% or less and a steel sheet for satisfying a relation of (ultimate tensile strength×total elongation≥16000 MPa×%) is produced.

The sample to be subjected to the X-ray diffraction may be measured while adjusting the sample by the above-described method in such a manner that the steel sheet is reduced in thickness from the surface to a predetermined sheet thickness by mechanical polishing or the like, a strain is then removed by chemical polishing, electrolytic polishing or the like, and an appropriate plane becomes a measuring plane in the sheet thickness range of ⅜ to ⅝.

As a matter of course, when the limitation relating to the above-described X-ray intensity is satisfied not only near a center portion of the sheet thickness but also at as many thickness portions as possible, the material anisotropy becomes further smaller. However, the range of ⅜ to ⅝ from the surface of the steel sheet is measured to make it possible to represent material properties of the entire steel sheet in general. Thus, ⅝ to ⅜ of the sheet thickness is defined as the measuring range.

Further, the crystal orientation represented by {hkl} <uvw> means that the normal direction of a steel sheet plane is parallel to <hkl> and a rolling direction is parallel to <uvw>. With respect to the crystal orientation, normally, orientations vertical to the sheet plane are represented by [hkl] or {hkl} and orientations parallel to the rolling direction are represented by (uvw) or <uvw>. {hkl} and <uvw> are collective terms for equivalent planes, [hkl] and (uvw) represent individual crystal planes. That is, since a body-centered cubic structure is applied to the present invention, for example, (111), (−111), (1−11), (11−1), (−1−11), (−11−1), (1−1−1), and (−1−1−1) planes are equivalent and cannot be distinguished from each other. In such a case, these orientations are collectively called {111}. Since an ODF representation is also used for representing orientations of other low symmetric crystal structures, individual orientations are generally represented by [hkl] (uvw), but, in the present invention, [hkl] (uvw) and {hkl} <uvw> are synonymous with each other. The measurement of the crystal orientation by an X-ray is performed according to a method disclosed in, for example, Cullity, Theory of X-ray diffraction (issued in 1986, translated by MATSUMURA, Gentaro, published by AGNE Inc.) on pages 274 to 296.

In the present invention, the anisotropy was estimated using the total elongation in the tensile test, but the same anisotropy also occurs in the steel sheet, in which the texture is developed, with respect to uniform elongation or bendability. In the steel sheet of the present invention, therefore, the anisotropy of the bendability or uniform elongation is also small.

In the present invention, the excellent formability means that a steel sheet satisfies the relation of (ultimate tensile strength×total elongation (C–El)≥16000 MPa·%) represented by the product of the ultimate tensile strength and the total elongation in the direction vertical to the rolling direction. The formability is preferably 18000 MPa·% or more and is more preferably 20000 MPa·% or more.

(Microstructure of Base Steel Sheet)

Next, a microstructure of the base steel sheet will be described.

In the present invention, the base steel sheet is provided such that a primary phase is a ferrite of 40% or more by volume fraction and a residual austenite is dispersed with 8% or more and less than 60% by volume fraction to ensure the ultimate tensile strength of 980 MPa or more and excellent formability. Thus, it is necessary to contain the residual austenite. Moreover, the ferrite phase may be a form of an acicular ferrite in addition to a polygonal ferrite.

By using the primary phase as the ferrite, a ferrite having high ductility becomes the primary phase, and thus the ductility is improved. By containing the residual austenite as a second phase, high strengthening and the further improvement of the ductility are achieved at the same time. When the residual austenite is less than 8% by volume fraction, since the effect is difficult to obtain, a lower limit of the residual austenite is 8%. A bainite structure is inevitably contained to stabilize of the residual austenite. In order to achieve the further high strengthening, martensite may be contained. In addition, when the volume fraction is less than 10%, a pearlite structure may be contained.

Furthermore, each phase of the microstructures such as ferrite, martensite, bainite, austenite, pearlite, and residual structures can be identified and their locations and volume fraction can be observed and quantitatively measured using an optical microscope having a magnification of 1000 times and a scanning and transmission electron microscope having a magnification of 1000 times to 100000 times after a cross section of the steel sheet in a rolling direction or a cross section in the right angle direction of the rolling direction is etched using a Nital reagent and the reagent as disclosed in JP 59-219473A. The area fraction of each structure can be obtained by each observing 20 or more fields and applying the point-count method or image analysis. Then, the obtained area fraction is defined as the volume fraction of each structure.

(Chemical Composition of Base Steel Sheet)

Next, reasons for restricting the amounts of the composition will be described. Moreover, % means % by mass. In the present invention, the base steel sheet contains, by mass %, C: 0.1 to less than 0.40%, Si: 0.5 to 3.0%, and Mn: 1.5 to 3.0%, O: limited to 0.006% or less, P: limited to 0.04% or less, S: limited to 0.01% or less, Al: limited to 2.0% or less, N: limited to 0.01% or less, and a balance including Fe and inevitable impurities.

C: C is an element which can increase the strength of the steel sheet. However, when the content is less than 0.1%, it is difficult to achieve both of the tensile strength of 980 MPa or more and the workability. On the other hand, when the content exceeds 0.40%, it is difficult to ensure the spot weldability. For this reason, the range is limited to 0.1 to 0.40% or less.

Si: Si is a strengthening element and is effective for increasing the strength of the steel sheet. The addition is essential because of suppressing precipitation of cementite and contributing to stabilizing the residual austenite. However, when the content is less than 0.5%, the effect of high strengthening is small. On the other hand, when the content exceeds 3.0%, the workability is decreased. Accordingly, the content of Si is limited to the range of 0.5 to 3.0%.

Mn: Mn is a strengthening element and is effective for increasing the strength of the steel sheet. However, when the content is less than 1.5%, it is difficult to obtain the tensile strength of 980 MPa or more. Conversely, when the content is a large quantity, it facilitates co-segregation with P and S and leads to a remarkable deterioration in the workability, and thus the upper limit is 3.0%. More preferably, the range is 2.0 to 2.7%.

O: O forms oxides to cause a deterioration in the bendability and hole expandability, and thus it is necessary to restrict an additive amount. In particular, the oxides often exist in the form of inclusions, and when these exist in a punched out edge or a cut cross-section, then notch-like surface defects or coarse dimples may form at the edge surface. As a result, stress concentration tends to occur during hole expansion or large deformation process, which can then act as an origin for crack formation; therefore, dramatic deterioration in the hole expandability and bendability occurs. When the content of O exceeds 0.006%, then these tendencies become remarkable, and therefore the upper limit of the content of O is 0.006% or less. When the content is less than 0.0001%, the cost excessively increases and thus it is undesirable economically. Accordingly, this value is a substantial lower limit.

P: P tends to segregate at the center part of thickness of the steel sheet and causes the weld zone to become brittle. When the content exceeds 0.04%, the embrittlement of the weld zone becomes remarkable, so the suitable range is limited to 0.04% or less. The lower limit value of P is not particularly determined, but when the lower limit is less than 0.0001%, it is disadvantageous economically, so this value is preferably set to the lower limit value.

S: S has an adverse effect on the weldability and on the manufacturability at the time of casting and hot rolling. For this reason, the upper limit value was 0.01% or less. The lower limit value of S is not particularly determined, but when the lower limit is less than 0.0001%, it is disadvantageous economically, so this value is preferably set to the lower limit value. Since S combines with Mn to form coarse MnS, which deteriorates the bendability and the hole expandability, the content of S is necessary to reduce as much as possible.

Al: Al promotes the formation of ferrite, which improves the ductility, and may therefore be added. Furthermore, Al can also act as a deoxidizing material. However, excessive addition increases the number of Al-based coarse inclusions, which can cause the deterioration in hole expandability as well as surface defects. For this reason, the upper limit for the Al addition is 2.0%. Preferably, the upper limit is 0.05% or less. The lower limit is not particularly limited, but it is difficult to set to be less than 0.0005%, so this value is a substantial lower limit.

N: N forms coarse nitrides and causes the deterioration of the bendability and hole expandability, so it is necessary to restrict the additive amount. This is because when the content of N exceeds 0.01%, the above tendency becomes remarkable, so the content of N is in a range of 0.01% or less. In addition, this causes blowholes to occur at the time of welding, so the less the better. The effect of the present invention is exhibited without particularly limiting the lower limit, but when the content of N is less than 0.0005%, the manufacturing cost dramatically increases, so this value is a substantial lower limit.

In the present invention, the base steel sheet may further contain any one or two or more of the following elements which are conventionally used for, for example, strength enhancement.

Mo: Mo is a strengthening element and is important for improvement of hardenability. However, when the content is less than 0.01%, these effects cannot be obtained, so the lower limit value was 0.01%. Conversely, when the content exceeds 1%, it has an adverse effect on the manufacturability at the time of manufacturing and hot rolling, so the upper limit value was 1%.

Cr: Cr is a strengthening element and is important for improvement of hardenability. However, when the content is less than 0.05%, these effects cannot be obtained, so the lower limit value was 0.05%. Conversely, when the content exceeds 1%, it has an adverse effect on the manufacturability at the time of manufacturing and hot rolling, so the upper limit value was 1%.

Ni: Ni is a strengthening element and is important for improvement of hardenability. However, when the content is less than 0.05%, these effects cannot be obtained, so the lower limit value was 0.05%. Conversely, when the content exceeds 1%, it has an adverse effect on the manufacturability at the time of manufacturing and hot rolling, so the upper limit value was 1%. In addition, it may be added to cause the improvement of the wettability and the promotion of the alloying reaction.

Cu: Cu is a strengthening element and is important for improvement of hardenability. However, when the content is less than 0.05%, these effects cannot be obtained, so the lower limit value was 0.05%. Conversely, when the content exceeds 1%, it has an adverse effect on the manufacturability at the time of manufacturing and hot rolling, so the upper limit value was 1%. In addition, it may be added to cause the improvement of the wettability and the promotion of the alloying reaction.

B is effective for grain boundary strengthening and steel strengthening by addition of 0.0001 mass % or more, but when the additive amount thereof exceeds 0.01 mass %, not only the effect of addition becomes saturated, but the manufacturability at the time of hot rolling is decreased, so the upper limit thereof was 0.01%.

Ti: Ti is a strengthening element. It helps to increase the strength of the steel sheet through precipitate strengthening, grain-refining strengthening due to the growth inhibition of ferrite crystal grains, and dislocation strengthening due to the inhibition of recrystallization. When the additive amount is less than 0.005%, these effects cannot be obtained, so the lower limit value was 0.005%. When the content exceeds 0.3%, carbonitride precipitation increases and the formability tends to deteriorate, so the upper limit was 0.3%.

Nb: Nb is a strengthening element. It helps to increase the strength of the steel sheet through the precipitate strengthening, the grain-refining strengthening due to the growth inhibition of ferrite crystal grains, and the dislocation strengthening due to the inhibition of recrystallization. When the additive amount is less than 0.005%, these effects cannot be obtained, so the lower limit value was 0.005%. When the content exceeds 0.3%, the carbonitride precipitation increases and the formability tends to deteriorate, so the upper limit was 0.3%.

V: V is a strengthening element. It helps to increase the strength of the steel sheet through the precipitate strengthening, the grain-refining strengthening due to the growth inhibition of ferrite crystal grains, and the dislocation strengthening due to the inhibition of recrystallization. When the additive amount is less than 0.005%, these effects cannot be obtained, so the lower limit value was 0.005%. When the content exceeds 0.5%, the carbonitride precipitation increases and the formability tends to deteriorate, so the upper limit was 0.5%.

One or two or more elements selected from Ca, Mg, and REM may be added by 0.0005 to 0.04% in total. Ca, Mg, and REM are elements used for deoxidation and one or two or more elements of 0.0005% or more are preferably contained in total. REM indicates a rare earth metal. However, when the content exceeds 0.04% in total, this may cause deterioration of the formability. Therefore, the total content of the elements is 0.0005 to 0.04%. Further, in the present invention, REM is generally added in a mischmetal, which in addition to La and Ce may also contain other lanthanoid series elements in combination. The effects of the present invention are exhibited even when the lanthanoid series elements other than La and Ce are contained as inevitable impurities. However, the effects of the present invention are exhibited even when metals such as La and Ce are added.

(Chemical Composition of Hot-Dip Galvanized Layer and Alloyed Hot-Dip Galvanized Layer)

In the present invention, a hot-dip galvanized layer formed on the surface of the base steel sheet contains less than 7 mass % Fe, the balance being Zn, Al, and inevitable impurities. In addition, an alloyed hot-dip galvanized layer contains 7 to 15 mass % Fe, and the balance being Zn, Al, and inevitable impurities. Further, when the base steel sheet is subjected to a hot-dip galvanizing treatment by dipping in a hot-dip galvanizing bath, a hot-dip galvanized layer containing less than 7 mass % Fe is formed on the surface of the base steel sheet. In addition, after the galvanizing treatment, when an alloying treatment is subsequently performed, an alloyed hot-dip galvanized layer containing 7 to 15 mass % Fe is formed on the surface of the base steel sheet.

Depending on the presence or absence of the alloying treatment, the galvanized layer is formed of zinc or an alloy of Fe-zinc. Zinc oxide may be contained in the surface of the galvanized layer, but when the content (%) of Fe contained in the galvanized layer is within a range of the present invention, the effect of the present invention can be obtained. In addition, since the base steel sheet of the present invention contains Si, Mn, or Al, even though the oxide formed during the annealing may exist in a boundary between the base steel sheet and the galvanized layer or exist in the galvanized layer, the effect of the present invention is exhibited in either case.

In the case where spot weldability and a coating property are desired, it is possible to improve these properties by forming the alloyed hot-dip galvanized layer containing 7 to 15 mass % Fe on the surface of the base steel sheet. Specifically, when the base steel sheet is subjected to the alloying treatment after being dipped in the galvanizing bath, Fe is incorporated into the galvanized layer, and thus the high-strength alloyed hot-dip galvanized steel sheet having an excellent coating property and spot weldability can be obtained. When the content of Fe after the alloying treatment is less than 7 mass %, the spot weldability becomes insufficient. On the other hand, when the content of Fe exceeds 15 mass %, the adhesion of the galvanized layer itself is impaired, and the galvanized layer is broken and fractured and dropped out in machining, thereby causing scratches when forming by adhering to a mold. Accordingly, the content of Fe contained in the galvanized layer during the alloying treatment is within a range of 7 to 15 mass %.

Further, in a case where the alloying treatment is not performed, even when the content of Fe contained in the galvanized layer is less than 7 mass %, the corrosion resistance, the formability, and hole expandability which are effects obtained by the alloying are good except for the spot welding.

Further, the galvanized layer may contain Al, Mg, Mn, Si, Cr, Ni, Cu or the like in addition to Fe.

In order to measure the content of Fe and Al contained in the galvanized layer, a method of dissolving the galvanized layer with an acid and chemically analyzing the dissolved solution may be used. For example, with respect to the alloyed hot-dip galvanized steel sheet cut into 30 mm×40 mm, only the galvanized layer is dissolved while suppressing elution of the base steel sheet with an inhibitor-added 5% HCl aqueous solution. Then, the content of Fe and Al is quantified using signal intensities obtained by ICP emission analysis of the dissolved solution and a calibration curve prepared from concentration-known solutions. Further, in consideration of measured variation of samples, an average value is employed obtained by measuring at least three samples which are cut out from the same alloyed hot-dip galvanized steel sheet.

The coated amount of the plating is not particularly limited, but is preferably 5 g/m$^2$ or more in the coated amount on a single surface of the base steel sheet from the viewpoint of corrosion resistance. In addition, the coated amount on the single surface is preferably no greater than 100 g/m$^2$ from the viewpoint of ensuring the plating adhesion.

(Manufacturing Method of Steel Sheet)

In order to obtain a steel sheet having a small material anisotropy of 980 MPa or more in the present invention, it is important to provide a steel sheet in which formation of a specific texture is suppressed. Hereinafter, details of manufacturing conditions will be described to simultaneously satisfy these factors.

A manufacturing method prior to hot rolling is not limited in particular. That is, subsequently to melting by a shaft furnace, an electric furnace, or the like, secondary refining may be variously performed, and then casting may be performed by normal continuous casting, or by an ingot method, or further by thin slab casting, or the like. In the case of a continuous casting, it is possible that a continuous cast slab is once cooled down to low temperature and thereafter is reheated to then be subjected to hot rolling, or it is also possible that a continuous cast slab is subjected to hot rolling continuously. A scrap may also be used for a raw material of the steel.

(First Hot Rolling)

A slab extracted from a heating furnace is subjected to a rough rolling process being first hot rolling to be rough rolled, and thereby a rough bar is obtained. The present inventive steel sheet needs to satisfy the following requirements. First, an austenite grain diameter after the rough rolling, namely an austenite grain diameter before finish rolling is important. The austenite grain diameter before the finish rolling is desirably small, and the austenite grain diameter of 200 μm or less greatly contributes to making crystal grains fine and homogenization of crystal grains.

In order to obtain the austenite grain diameter of 200 μm or less before the finish rolling, it is necessary to perform rolling at a reduction ratio of 40% or more one time or more in the rough rolling in a temperature region of 1000 to 1200° C.

The austenite grain diameter before the finish rolling is desirably 160 μm or less or 100 μm or less, and in order to obtain this grain diameter, rolling at 40% or more is performed two times or more. However, in the rough rolling, when the reduction is greater than 70% or rolling is performed greater than 10 times, there is a concern in that the rolling temperature decreases or a scale is generated excessively.

It is supposed that an austenite grain boundary after the rough rolling (namely, before the finish rolling) functions as one of recrystallization nuclei during the finish rolling. The austenite grain diameter after the rough rolling is confirmed in a manner that a steel sheet piece before being subjected to the finish rolling is quenched as much as possible, (which is cooled at 10° C./second or more, for example), and a cross section of the steel sheet piece is etched to make austenite grain boundaries appear, and the austenite grain boundaries are observed by an optical microscope. On this occasion, at 50 or more magnifications, the austenite grain diameter of 20 visual fields or more is measured by image analysis or a point counting method.

(Second Hot Rolling)

After the rough rolling process (first hot rolling) is completed, a finish rolling process being second hot rolling is started. The time between the completion of the rough rolling process and the start of the finish rolling process is desirably set to 150 seconds or shorter.

In the finish rolling process (second hot rolling), a finish rolling start temperature is desirably set to 1000° C. or higher. When the finish rolling start temperature is lower than 1000° C., at each finish rolling pass, the temperature of the rolling to be applied to the rough bar to be rolled is decreased, the reduction is performed in a non-recrystallization temperature region, the texture develops, and thus the isotropy deteriorates.

Incidentally, the upper limit of the finish rolling start temperature is not limited in particular. However, when it is 1150° C. or higher, a blister to be the starting point of a scaly spindle-shaped scale defect is likely to occur between a steel sheet base iron and a surface scale before the finish rolling and between passes, and thus the finish rolling start temperature is desirably lower than 1150° C.

In the finish rolling, a temperature determined by the chemical composition of the steel sheet is set to T1, and in a temperature region of T1+30° C. or higher and T1+200° C. or lower, the rolling at 30% or more is performed in one pass at least one time. Further, in the finish rolling, the total reduction ratio is set to 50% or more. By satisfying this condition, at the range of ⅝ to ⅜ in sheet thickness from the surface of the steel sheet, the average value of the pole densities of the orientation groups {100} <011> to {223} <110> becomes 6.5 or less and the pole density of the crystal orientation {332} <113> becomes 5.0 or less. Thus, the high strength steel sheet having the small material anisotropy can be obtained.

Here, T1 is the temperature calculated by Expression (1) below.

$$T1(°C.)=850+10\times(C+N)\times Mn+350\times Nb+250\times Ti+40\times B+10\times Cr+100\times Mo+100\times V \quad \text{Expression (1)}$$

C, N, Mn, Nb, Ti, B, Cr, Mo, and V each represent the content of each element (mass %). Further, Ti, B, Cr, Mo, and V are calculated as zero when not being contained Heavy reduction in the temperature region of T1+30° C. or higher and T1+150° C. or lower and light reduction at equal to or higher than T1 and lower than T1+30° C. thereafter control the average value of the pole densities of the orientation groups {100} <011> to {223} <110> and the pole density of the crystal orientation {332} <113> at the range of ⅝ to ⅜ in sheet thickness from the surface of the steel sheet, and thereby the material anisotropy of the final product are drastically improved, as indicated Tables 2 and 3 of Example to be described later.

This T1 temperature itself is obtained empirically. The present inventors learned empirically by experiments that the recrystallization in an austenite region of each steel is promoted based on the T1 temperature. In order to obtain better material uniformity, it is important to accumulate strain by the heavy reduction, and the total reduction ratio of 50% or more is essential in the finish rolling. Further, it is desired to take reduction at 70% or more, and on the other hand, when the reduction ratio greater than 90% is taken, securing a temperature and an excessive rolling load are as a result added.

When the total reduction ratio in the temperature region of T1+30° C. or higher and T1+200° C. or lower is less than 50%, rolling strain to be accumulated during the hot rolling is not sufficient and the recrystallization of austenite does not advance sufficiently. Therefore, the texture develops and the isotropy deteriorates. When the total reduction ratio is 70% or more, the sufficient isotropy can be obtained even though variations ascribable to temperature fluctuation or the like are considered. On the other hand, when the total reduction ratio exceeds 90%, it becomes difficult to obtain the temperature region of T1+200° C. or lower due to heat generation by working, and further a rolling load increases to cause a risk that the rolling becomes difficult to be performed In the finish rolling, in order to promote the uniform recrystallization caused by releasing the accumulated strain, the rolling at 30% or more is performed in one pass at least one time at T1+30° C. or higher and T1+200° C. or lower.

Incidentally, in order to accelerate uniform recrystallization through releasing of accumulated strain, it is necessary to suppress as much as possible the working amount in a temperature range of lower than T1+30° C. after the heavy reduction at T1+30° C. or higher and T1+200° C. or lower. For this reason, the reduction ratio at lower than T1+30° C. is desirably 30% or less. The reduction ratio of 10% or more is desirable in terms of improving the sheet shape, but a reduction ratio of 0% is desirable in the case where the hole expandability is further focused. In addition, when the reduction ratio at less than T1+30° C. is large, recrystallized austenite grains are expanded, and, when a retention time after the finish rolling is short, recrystallization does not sufficiently proceed, and the material anisotropy becomes large. That is, in the manufacturing conditions of the present invention, when the austenite is uniformly and finely recrystallized in the finish rolling, the texture of the product is controlled and the material anisotropy is improved.

A rolling ratio can be obtained by actual performances or calculation from the rolling load, sheet thickness measurement, or/and the like. The temperature can be actually measured by a thermometer between stands, or can be obtained by calculation simulation in consideration of the heat generation by working from a line speed, the reduction ratio or the like. Alternatively, it is possible to be obtained by both of them.

The hot rolling (first hot rolling and second hot rolling) performed as described above is finished at a temperature of $Ar_3$ transformation temperature or higher. When the hot rolling is finished at $Ar_3$ or lower, the hot rolling becomes two-phase region rolling of austenite and ferrite, and accumulation to the orientation groups {100} <011> to {223} <110> becomes strong. As a result, the material anisotropy is promoted.

(Cooling Before Cold-Rolling)

After final reduction at a reduction ratio of 30% or more is performed in the finish rolling, a cooling before cold-rolling is started in such a manner that a waiting time t second satisfies Expression (2) below.

$$t \leq 2.5 \times t1 \quad \text{Expression (2)}$$

Here, t1 is obtained by Expression (3) below.

$$t1=0.001\times((Tf-T1)\times P1/100)^2-0.109\times((Tf-T1)\times P1/100)+3.1 \quad \text{Expression (3)}$$

Here, in Expression (3) above, Tf represents the temperature of a steel billet obtained after the final reduction at a reduction ratio of 30% or more, and P1 represents the reduction ratio of the final reduction at 30% or more.

Incidentally, the "final reduction at a reduction ratio of 30% or more" indicates the rolling performed finally in the rolling processes whose reduction ratio becomes 30% or more out of the rolling processes in a plurality of passes performed in the finish rolling. For example, in the rolling processes in a plurality of passes performed in the finish rolling, when the reduction ratio of the rolling performed at the final stage is 30% or more, the rolling performed at the final stage is the "final reduction at a reduction ratio of 30% or more." Further, in the rolling processes in a plurality of passes performed in the finish rolling, when the reduction ratio of the rolling performed prior to the final stage is 30% or more and after the rolling performed prior to the final stage (rolling at a reduction ratio of 30% or more) is performed, the rolling whose reduction ratio becomes 30% or more is not performed, the rolling performed prior to the final stage (rolling at a reduction ratio of 30% or more) is the "final reduction at a reduction ratio of 30% or more."

In the finish rolling, after the final reduction at a reduction ratio of 30% or more is performed, the waiting time t second until the cooling before cold-rolling is started greatly affects the austenite grain diameter and strongly affects the structure after cold rolling and annealing. When the waiting time t exceeds t1×2.5, grain coarsening is progressed and the elongation is remarkably reduced.

The waiting time t second further satisfies Expression (2a) below, thereby making it possible to preferentially suppress the growth of the crystal grains. Consequently, even though the recrystallization does not advance sufficiently, it is possible to sufficiently improve the elongation of the steel sheet and to improve a fatigue property simultaneously.

$$t < t1 \quad \text{Expression (2a)}$$

At the same time, the waiting time t second further satisfies Expression (2b) below, and thus the recrystallization advances sufficiently and the crystal orientations are randomized. Therefore, it is possible to sufficiently improve the elongation of the steel sheet and to greatly improve the isotropy simultaneously.

$$t1 \leq t \leq t1 \times 2.5 \quad \text{Expression (2b)}$$

Figure 3:
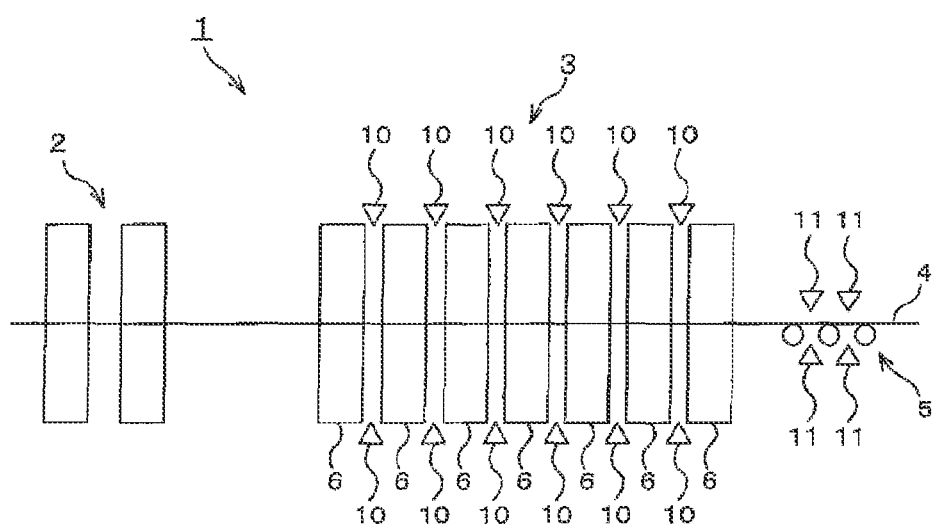
FIG. 3 is an explanatory diagram of a continuous hot rolling line.

Here, as illustrated in FIG. 3, on a continuous hot rolling line 1, the steel billet (slab) heated to a predetermined temperature in the heating furnace is rolled in a roughing mill 2 and in a finishing mill 3 sequentially to be a hot-rolled steel sheet 4 having a predetermined thickness, and the hot-rolled steel sheet 4 is carried out onto a run-out-table 5. In the manufacturing method of the present invention, in the rough rolling process (first hot rolling) performed in the roughing mill 2, the rolling at a reduction ratio of 40% or more is performed on the steel billet (slab) one time or more in the temperature range of 1000° C. or higher and 1200° C. or lower.

The rough bar rolled to a predetermined thickness in the roughing mill 2 in this manner is next finish rolled (is subjected to the second hot rolling) through a plurality of rolling stands 6 of the finishing mill 3 to be the hot-rolled steel sheet 4. Then, in the finishing mill 3, the rolling at 30% or more is performed in one pass at least one time in the temperature region of T1+30° C. or higher and T1+200° C. or lower. Further, in the finishing mill 3, the total reduction ratio becomes 50% or more.

Further, in the finish rolling process, after the final reduction at a reduction ratio of 30% or more is performed, the cooling before cold-rolling is started in such a manner that the waiting time t second satisfies Expression (2) above or either Expression (2a) or (2b) above. The start of this cooling before cold-rolling is performed by inter-stand cooling nozzles 10 disposed between the respective two of the rolling stands 6 of the finishing mill 3, or cooling nozzles 11 disposed in the run-out-table 5.

For example, when the final reduction at a reduction ratio of 30% or more is performed only at the rolling stand 6 disposed at the front stage of the finishing mill 3 (on the left side in FIG. 3, on the upstream side of the rolling) and the rolling whose reduction ratio becomes 30% or more is not performed at the rolling stand 6 disposed at the rear stage of the finishing mill 3 (on the right side in FIG. 3, on the downstream side of the rolling), when the start of the cooling before cold-rolling is performed by the cooling nozzles 11 disposed in the run-out-table 5, a case where the waiting time t second does not satisfy Expression (2) above or Expressions (2a) and (2b) above is sometimes caused. In such a case, the cooling before cold-rolling is started by the inter-stand cooling nozzles 10 disposed between the respective two of the rolling stands 6 of the finishing mill 3.

Further, for example, when the final reduction at a reduction ratio of 30% or more is performed at the rolling stand 6 disposed at the rear stage of the finishing mill 3 (on the right side in FIG. 3, on the downstream side of the rolling), even though the start of the cooling before cold-rolling is performed by the cooling nozzles 11 disposed in the run-out-table 5, there is sometimes a case where the waiting time t second can satisfy Expression (2) above or Expressions (2a) and (2b) above. In such a case, the cooling before cold-rolling may also be started by the cooling nozzles 11 disposed in the run-out-table 5. Needless to say, as long as the performance of the final reduction at a reduction ratio of 30% or more is completed, primary cooling before cold-rolling may be also started by the inter-stand cooling nozzles 10 disposed between the respective two of the rolling stands 6 of the finishing mill 3.

Then, in this cooling before cold-rolling, the cooling that at an average cooling rate of 50° C./second or more, a temperature change (temperature drop) becomes 40° C. or higher and 140° C. or lower is performed.

When the temperature change is less than 40° C., the recrystallized austenite grains grow and low-temperature toughness deteriorates. The temperature change is set to 40° C. or more, thereby making it possible to suppress coarsening of the austenite grains. When the temperature change is less than 40° C., the effect cannot be obtained. On the other hand, when the temperature change exceeds 140° C., the recrystallization becomes insufficient to make it difficult to obtain a targeted random texture. Further, a ferrite phase effective for the elongation is also not obtained easily and the hardness of a ferrite phase becomes high, and thereby the formability also deteriorates. Further, when the temperature change is higher than 140° C., an overshoot to/below an Ar3 transformation point temperature is likely to be caused. In the case, even by the transformation from recrystallized austenite, as a result of sharpening of variant selection, the texture is formed and the isotropy decreases consequently.

When the average cooling rate in the cooling before cold-rolling is slower than 50° C./second, as expected, the recrystallized austenite grains grow and the low-temperature toughness deteriorates. The upper limit of the average cooling rate is not determined in particular, but in terms of the steel sheet shape, 200° C./second or less is considered to be proper.

In addition, as has been described previously, in order to promote the uniform recrystallization, it is preferable that a working amount at a temperature region of lower than T1+30° C. be as small as possible and the reduction ratio at the temperature region lower than T1+30° C. be 30% or less. For example, in the finishing mill 3 of the continuous hot rolling line 1 illustrated in FIG. 3, when passing through one or two or more rolling stands 6 disposed at the front-stage side (the left side in FIG. 3, the upstream side of the rolling), the steel sheet is in a temperature region of T1+30° C. or higher and T1+200° C. or lower, and when passing through one or two or more rolling stands 6 disposed at the rear-stage side (the right side in FIG. 3, the downstream side of the rolling), the steel sheet is in a temperature region lower than T1+30° C. When passing through one or two or more rolling stands 6 disposed at the rear-stage side (the right side in FIG. 3, the downstream side of the rolling), the reduction is not performed, or even though the reduction is performed, the reduction ratio at lower than T1+30° C. is preferably 30% or less in total. In terms of the sheet thickness accuracy and the sheet shape, the reduction ratio at lower than T1+30° C. is preferably 10% or less in total. In the case of requiring a more isotropy, the reduction ratio at the temperature region lower than T1+30° C. is preferably 0%.

In the manufacturing method of the present invention, a rolling speed is not limited in particular. However, when the rolling speed on the final stand side of the finish rolling is less than 400 mpm, γ grains grow to be coarse, regions in which ferrite can be precipitated to obtain the ductility are decreased, and thus the ductility is likely to deteriorate. Even though the upper limit of the rolling speed is not limited in particular, the effect of the present invention can be obtained, but it is realistic that the rolling speed is 1800 mpm or less due to facility restriction. Therefore, in the finish rolling process, the rolling speed is preferably 400 mpm or more and 1800 mpm or less. Further, in the hot rolling, the finishing rolling may be continuously performed by joining the sheet bar (rough bar) after the rough rolling. At this time, the rough bar is once coiled in a coil shape and is stored in a cover having a thermal insulation function as required. Then, the rough bar may be joined after being again re-coiled.

(Coiling)

After being obtained in this manner, the hot-rolled steel sheet can be coiled at 700° C. or lower. When a coiling temperature exceeds 700° C., a coarse ferrite or pearlite structure occurs in the hot-rolled structure and structural unhomogeneity after annealing increases. As a result, the material anisotropy of the final product is increased. In addition, when the hot-rolled steel sheet is coiled at a temperature exceeding 700° C., a thickness of oxide formed on the surface of the steel sheet excessively increases and it is difficult to perform the pickling. Even though the lower limit of the coiling temperature is not defined in particular, the effects of the present invention are exhibited. However, since it is technically difficult to coil at a temperature of room temperature or lower, the room temperature is substantially the lower limit.

(Pickling)

Pickling is performed on the hot-rolled steel sheet prepared in this manner. The pickling is an important process to remove the oxide on the surface of the base steel sheet and to improve a plating property. In addition, the pickling may be performed once or a plurality of times.

(Cold Rolling)

Next, cold rolling is performed on the hot-rolled steel sheet after the pickling at the reduction ratio of 40 to 80%. In the case where the reduction ratio is less than 40%, it is difficult to maintain the flattened shape. Further, in this case, since the ductility of the final product is deteriorated, the lower limit of the reduction ratio is 40%. On the other hand, when the cold rolling is performed at the reduction ratio exceeding 80%, a cold rolling load is excessively large and it is difficult to perform the cold rolling. For this reason, the upper limit of the reduction ratio is 80%. More preferably, the reduction ratio is in the range of 45 to 70%. The effects of the present invention can be exhibited without particularly defining the number of rolling passes and the reduction ratio of each pass.

(Hot-Dip Galvanizing)

After the cold rolling, the base steel sheet is subjected to hot-dip galvanizing through a continuous hot-dip galvanizing line (CGL).

(Annealing)

The steel sheet (base steel sheet) which has been subjected to the cold rolling is then heated to an annealing temperature of 750 to 900° C. in the continuous hot-dip galvanizing line. When the annealing temperature is lower than 750° C., a re-solid of carbide formed during the hot rolling requires a long time, all or a part of carbide remain, and thus it is difficult to ensure the strength of 980 MPa or more. From this reason, the lower limit of the annealing temperature is 750° C. On the other hand, since the heating to an excessive temperature leads to increase in cost, it is unfavorable economically and the sheet shape become poor or the lifetime of the roll is reduced. Therefore, the upper limit of the annealing temperature is 900° C. A holding time at the annealing temperature is not limited in particular, but the heat treatment is preferably performed for 10 seconds or longer to dissolve the carbide. On the other hand, when the heat treatment time becomes longer than 600 seconds, it leads to the increase in cost, which is unfavorable economically. The effects of the present invention may be exhibited by performing isothermal-holding at the annealing temperature of 750 to 900° C. and even by starting to cool it immediately after the steel sheet reaches the maximum temperature by performing gradient heating.

In heating the base steel sheet to the annealing temperature, an average heating rate from the room temperature or higher to 650° C. or lower is set to HR1 (° C./second) expressed by Expression (4) below, and an average heating rate from the temperature exceeding 650° C. to the annealing temperature is set to HR2 (° C./second) expressed by Expression (5) below.

$$HR1 \geq 0.3 \qquad \text{Expression (4)}$$

$$HR2 \leq 0.5 \times HR1 \qquad \text{Expression (5)}$$

The hot rolling is performed under the above-described condition, and further the cooling prior to the cold rolling is performed. Thus, both of the refinement of the crystal grains and randomization of the crystal orientations are achieved. However, by the cold rolling to be performed thereafter, the strong texture develops and the texture becomes likely to remain in the steel sheet. As a result, the isotropy of the steel sheet decreases. Thus, it is preferred to make the texture, which has developed by the cold rolling, disappear as much as possible by appropriately performing the heating to be performed after the cold rolling. For this reason, it is necessary to divide the average heating rate of the heating into two stages expressed by Expressions (4) and (5) above.

The detailed reason why the texture and properties of the base steel sheet are improved by this two-stage heating is unclear, but this effect is considered to be related to the recovery of dislocation and the recrystallization introduced at the time of the cold rolling. That is, a driving force of the recrystallization to occur in the steel sheet by the heating is strain accumulated in the steel sheet by the cold rolling. When the average heating rate HR1 at the temperature range from the room temperature or higher to 650° C. or lower is small, the dislocation introduced by the cold rolling recovers and the recrystallization does not occur. As a result, the texture which has developed at the time of the cold rolling remains as it is and the properties such as the isotropy deteriorate. When the average heating rate HR1 at the temperature range from the room temperature or higher to 650° C. or lower is less than 0.3° C./second, the dislocation introduced by the cold rolling recovers, resulting in that the strong texture formed at the time of the cold rolling remains. Therefore, it is necessary to set the average heating rate HR1 at the temperature range from the room temperature or higher to 650° C. or lower to 0.3 (° C./second) or more. When the average heating rate HR1 is 0.3 (° C./second) or more, it is possible to make the recrystallization from the ferrite (recovery of the dislocation is slow) having a large dislocation density, recrystallized grains having different crystal orientations are formed, the texture is randomized, and thus the anisotropy is reduced. In addition, when the heating rate exceeds 100 (° C./second), facility investment becomes excessive, and thus it is unfavorable economically. Therefore, the upper limit of the average heating rate HR1 is substantially 100 (° C./second).

On the other hand, when the average heating rate HR2 from the temperature exceeding 650° C. to the annealing temperature is large, ferrite existing in the steel sheet after the cold rolling does not recrystallize and non-recrystallized ferrite in a state of being worked remains. When the steel containing C of over 0.1% in particular is heated to a two-phase region of ferrite and austenite, the formed austenite inhibits the growth of recrystallized ferrite, and thus non-recrystallized ferrite becomes more likely to remain. This non-recrystallized ferrite has a strong texture, to thus adversely affect the isotropy, and this non-recrystallized ferrite contains a lot of dislocations to thus drastically deteriorate the ductility. For this reason, at the temperature range from the temperature exceeding 650° C. to the annealing temperature, the average heating rate HR2 needs to be 0.5×HR1 (° C./second) or less. When the average heating rate HR2 exceeds 0.5×HR1 (° C./second), the carbide becomes the austenite prior to the recrystallization, and the formed austenite grains delay the growth of the recrystallized grains. As a result, the texture in a state of being cold-rolled remains, and thus the anisotropy increases.

From results obtained by earnestly investigating the relation between manufacturing conditions and the texture in detail, the inventors have found that the randomization of the texture and the reduction of the anisotropy can be achieved when the HR1 is twice or above of the HR2. It is difficult to obtain the randomization of the texture by controlling such a heating rate by a conventional annealing in which the heating rate is constant.

(Cooling after Annealing)

After being subjected to the annealing, the base steel sheet is cooled to 500° C. from the annealing temperature at an average cooling rate of 0.1 to 200° C./second. When the average cooling rate is slower than 0.1° C./second, the productivity is largely impaired. On the other hand, when the cooling rate excessively rises, the manufacturing cost increases. Accordingly, the upper limit of the average cooling rate is 200° C./second. Further, the cooling rate in the temperature region of 650 to 500° C. is preferably 3 to 200° C./second. When the cooling rate is very slow, the austenite structure is transformed into the pearlite structure in the cooling process. Since it is difficult to ensure the austenite of 8% or more by volume fraction, the cooling rate is preferably 3° C./second or faster. Example of a cooling method may include roll cooling, air cooling, water cooling, and any one of combinations of these cooling methods.

(Temperature-Holding)

Thereafter, the temperature is held between 500 and 350° C. for 10 to 1000 seconds. In the temperature-holding process, bainite transformation occurs and the residual austenite is stabilized. The reason why the upper limit of the holding temperature is set to 500° C. is because the bainite transformation occurs at this temperature or lower. On the other hand, when the temperature is held at the temperature region of below 350° C., it takes a long time for the bainite transformation to occur, the facilities are excessive, and thus the productivity is decreased. Accordingly, the holding temperature is 500 to 350° C. The lower limit of the holding time is 10 seconds. The reason is because the bainite transformation is not sufficiently progressed at the holding of less than 10 seconds, the residual austenite is not stabilized, and the excellent formability is not obtained. On the other hand, the holding of exceeding 1000 seconds deteriorates the productivity. Furthermore, the holding does not indicate only the isothermal-holding, but also includes a cold removal and heating at this temperature region.

(Hot-Dip Galvanizing and Alloyed Hot-Dip Galvanizing)

The cold-rolled steel sheet (base steel sheet) manufactured in this manner is then dipped in a hot-dip galvanizing bath and is subjected to a hot-dip galvanizing treatment, so that the high-strength hot-dip galvanized steel sheet of the present invention is manufactured. In addition, after the galvanizing treatment, when an alloying treatment is subsequently performed, the high-strength alloyed hot-dip galvanized steel sheet of the present invention is manufactured.

Preferably, a temperature of the base steel sheet to be dipped in the hot-dip galvanizing bath is in a range from a temperature lower than 40° C. compared with the temperature of the hot-dip galvanizing bath to a temperature higher than 50° C. compared with the temperature of the hot-dip galvanizing bath. When the temperature of the base steel sheet to be dipped is below "temperature of hot-dip galvanizing bath−40" (° C.), the heat loss upon dipping into the galvanizing bath becomes large and a part of the molten zinc is solidified, thereby leading to a deterioration of the galvanized external appearance in some cases. Before being dipped in the galvanizing bath, the base steel sheet may be dipped by re-heating the sheet to a temperature of the (temperature of hot-dip galvanizing bath−40)° C. or higher. In addition, when the temperature of the base steel sheet is above "temperature of hot-dip galvanizing bath+50)° C., operational problems associated with a temperature rise of the galvanizing bath are induced.

In addition, the alloying treatment of the galvanized layer is performed at 460° C. or higher. When the alloying treatment temperature is lower than 460° C., the progress of the alloying is delayed and the productivity is decreased. The upper limit is not limited in particular, but when the alloying treatment temperature is over 600° C., the carbide is formed and the volume fraction of a hard structure (martensite, bainite, residual austenite) is reduced, so that it is difficult to ensure the excellent ductility. Therefore, the upper limit is substantially 600° C.

In order to suppress galvanizing faults and to promote the alloying, it is preferable that a jet flow of 10 m/min or more and 50 m/min or less be provided in the galvanizing bath. Scum, which is an oxide film of Zn or Al, is floated on the surface of the galvanizing bath. When the oxide film remains on the surface of the base steel sheet in large amounts, the scum adheres to the surface of the base steel sheet at the time of dipping in the galvanizing bath and the galvanizing faults easily occur. Further, the scum adhering to the steel sheet causes not only the galvanizing faults but also the alloying delay.

This property is particularly remarkable in the steel sheet containing a lot of Si and Mn. The detailed mechanism is unclear, but it is considered that the galvanizing faults and the alloying delay are facilitated by reacting between the oxide of Si and Mn, which is formed on the surface of the base steel sheet, and the scum as the oxide as well. The reason for setting the flow rate of the jet flow to 10 m/min or more and 50 m/min or less is because the suppressing effect of the galvanizing faults due to the jet flow cannot be obtained at the flow rate slower than 10 m/min. The reason for setting the flow rate to 50 m/min or less is because the suppressing effect of the galvanizing faults is saturated and a high cost due to the excessive facility investment is also avoided.

The purpose of setting the flow rate of the molten zinc in the bath to 10 m/min or more and 50 m/min or less is to prevent the adhesion of dross onto the surface of the base steel sheet. From this reason, it is mainly preferable that the flow rate be within the above range up to a depth of the base steel sheet which is dipped in the galvanizing bath. Meanwhile, the dross may be deposited on the bottom of the galvanizing bath in some cases. In this case, when the molten zinc near the bottom of the bath flows, it is increasingly concerned that the dross adheres to the surface of the base steel sheet by a splashing of the deposited dross. Thus, the flow rate is preferably set to a region from the surface of the galvanizing bath to the depth of the base steel sheet which is dipped in the galvanizing bath. The size of the galvanizing bath may be any width as long as the base steel sheet can be dipped, but the size of the steel sheet for automotive exterior is generally up to about 2 m of a width. The size of the galvanizing bath may be sufficiently larger than the above size. Since the dross is deposited on the bottom of the galvanizing bath, the zinc flows in the bath by the passing sheet, and thus it is concerned that the dross adheres to the surface of the base steel sheet by the splashing of the dross. Therefore, the depth of the bath is preferably deep.

In addition, the galvanizing bath may contain Fe, Al, Mg, Mn, Si, Cr and the like in addition to pure zinc.

Further, in order to further improve the plating adhesion, before the annealing in the continuous hot-dip galvanizing line, the base steel sheet may be subjected to the plating treatment using materials consisting of a single or a plurality of Ni, Cu, Co, or Fe. In addition, examples of the plating treatment include a sendimir method of "degreasing, pickling, then heating in a nonoxidizing atmosphere, annealing under a reducing atmosphere which contains $H_2$ and $N_2$, then cooling to near the galvanizing bath temperature, and dipping in the galvanizing bath", a total reduction furnace method of "adjusting the atmosphere at the time of annealing to first oxidize the surface of the steel sheet, then using reduction to perform cleaning before the plating, and dipping in the galvanizing bath", or a flux method of "degreasing and pickling the steel sheet, then using ammonium chloride or the like for flux treatment, then dipping in the galvanizing bath". However, the present invention can be exhibited even when the treatment is performed in any conditions.

Further, in the case of manufacturing the alloyed hot-dip galvanized steel sheet, an effective Al concentration in the galvanizing bath is preferably controlled in the range of 0.05 to 0.500 mass % to control the properties of the galvanized layer. Here, the effective Al concentration in the galvanizing bath is a value obtained by subtracting a Fe concentration in the galvanizing bath from an Al concentration in the galvanizing bath.

When the effective Al concentration is less than 0.05 mass %, the dross significantly occurs and a good appearance cannot be obtained. On the other hand, the effective Al concentration is more than 0.500 mass %, the alloying is delayed and the productivity is decreased. For this reason, the upper limit of the effective Al concentration in the galvanizing bath is preferably 0.500 mass %.

Further, when the alloying is performed at a low temperature, the alloying treatment can be utilized to facilitate the bainite transformation.

Meanwhile, in order to improve the coating property and weldability, the surfaces of the hot-dip galvanized steel sheet and the alloyed hot-dip galvanized steel sheet of the present invention are subjected to upper layer plating and to a variety of treatments, for example, a chromate treatment, a phosphate treatment, a lubricity-improving treatment, a weldability-improving treatment or the like.

In addition, the hot-dip galvanized steel sheet and the alloyed hot-dip galvanized steel sheet of the present invention may be further subjected to skin pass rolling. The reduction ratio of the skin pass rolling is preferably in a range of 0.1 to 1.5%. When the reduction ratio is less than 0.1%, the effect is small and the control is also difficult. When the reduction ratio exceeds 1.5%, the productivity is remarkably decreased. The skin pass rolling may be performed in-line or off-line. Further, the skin pass of the intended reduction ratio may be performed once or in several times.

Example(s)

The present invention will be now described in detail by way of examples. Incidentally, conditions of the examples are condition examples employed for confirming the applicability and effects of the present invention, and the present invention is not limited to these condition examples. The present invention can employ various conditions as long as the object of the present invention is achieved without departing from the gist of the present invention. Chemical compositions of respective steels used in the examples are illustrated in Table 1. Respective manufacturing conditions are illustrated in Tables 2 and 3. Further, structural constitutions and mechanical properties of respective steel types under the manufacturing conditions of Table 2 are illustrated in Table 4. Incidentally, underlines in each Table indicate that a numeral value is out of the range of the present invention or is out of the range of a preferred range of the present invention.

There will be described results of examinations using inventive steels "A to S" and using comparative steels "a to d" which have compositions illustrated in Table 1. Incidentally, in Table 1, each numerical value of the chemical compositions indicates mass %. In Tables 2 to 4, English letters A to U and English letters a to g, which are attached to the steel types, indicate compositions of the inventive steels A to U and the comparative steels a to g in Table 1 respectively.

These steels (inventive steels A to S and comparative steels a to d) were heated to 1200° C. and then were subjected to the hot rolling under the conditions indicated in Table 2, and thereafter, the hot rolling was finished at an Ar3 transformation temperature or higher.

In the hot rolling, first, in rough rolling as first hot rolling, the rolling was performed one time or more at a reduction ratio of 40% or more in a temperature region of 1000° C. or higher and 1200° C. or lower. However, with respect to steel types A2, C2, E2, J2, and O2, in the rough rolling, the rolling at the reduction ratio of 40% or more in one pass was not performed. In the rough rolling, the number of times of reduction at the reduction ratio of 40% or more, each reduction ratio (%), and an austenite grain diameter (μm) after the rough rolling (before finish rolling) are indicated in Table 2. Further, a temperature T1 (° C.) of the respective steel types is indicated in Table 2.

After the rough rolling was finished, the finish rolling as second hot rolling was performed. In the finish rolling, rolling at a reduction ratio of 30% or more was performed in one pass at least one time in a temperature region of T1+30° C. or higher and T1+200° C. or lower, and in a temperature range below T1+30° C., the total reduction ratio was set to 30% or less. Incidentally, in the finish rolling, rolling at a reduction ratio of 30% or more in one pass was performed in a final pass in the temperature region of T1+30° C. or higher and T1+200° C. or lower.

However, with respect to steel types C3, E3, J3, and O3, the rolling at a reduction ratio of 30% or more was not performed in the temperature region of T1+30° C. or higher and T1+200° C. or lower. Further, with regard to steel types A4 and C4, the total reduction ratio in the temperature range below T1+30° C. was greater than 30%.

Further, in the finish rolling, the total reduction ratio was set to 50% or more. However, with regard to steel types A3, C3, E3, J3, and O3, the total reduction ratio in the temperature region of T1+30° C. or higher and T1+200° C. or lower was less than 50%.

Table 2 indicates the total reduction ratio (%) in the temperature region of T1+200° C. or lower, a temperature (° C.) after the reduction in the final pass in the temperature region of T1+30° C. or higher, and T1+30° C. or higher and T1+200° C. or lower, and P1: the reduction ratio of the final reduction of 30% or more (the reduction ratio in the final pass in the temperature region of T1+30° C. or higher and T1+200° C. or lower) (%), in the finish rolling. Further, Table 2 indicates the reduction ratio (%) at the time of the reduction in the temperature range below T1+30° C. in the finish rolling.

After the final reduction in the temperature region of T1+30° C. or higher and T1+200° C. or lower was performed in the finish rolling, cooling before cold-rolling was started before a waiting time t (second) passes 2.5×t1. In the cooling before cold-rolling, an average cooling rate was set to 50° C./second or more. Further, a temperature change (a cooled temperature amount) in the cooling before cold-rolling was set to fall within a range of 40° C. or higher and 140° C. or lower.

However, with respect to steel types A6, C4, E4, J4, and O3, the cooling before cold-rolling (after hot rolling-finish rolling·cooling) was started after the waiting time t (second) passes 2.5×t1 from the final reduction in the temperature region of T1+30° C. or higher and T1+200° C. or lower in the finish rolling. With regard to steel types A22, C16, E12, and E13, the temperature change (after hot rolling-finish rolling·cooling amount) in the cooling before cold-rolling was less than 40° C., and with regard to steel types A21, C15, and E11, the temperature change (after hot rolling-finish rolling·cooling amount) in the cooling before cold-rolling was higher than 140° C. With regard to steel types A22, C16, and E13, the average cooling rate (after hot rolling-finish rolling·cooling rate) in the cooling before cold-rolling was slower than 50° C./second.

Table 2 indicates t1 (second) of each steel type, the waiting time t (second) from the final reduction in the temperature region of T1+30° C. or higher and T1+200° C. or lower to the start of the cooling before cold-rolling in the finish rolling, t/t1, the temperature change (cooling amount) (° C.) in the cooling before cold-rolling, and the average cooling rate (° C./second) in the cooling before cold-rolling.

After the cooling before cold-rolling, coiling was performed at 700° C. or lower, and hot-rolled original sheets each having a thickness of 2 to 4.5 mm were obtained.

However, with respect to steel types A7 and C8, a coiling temperature was higher than 700° C. With respect to each of the steel types, the cooling stop temperature (coiling temperature) (° C.) of the cooling before cold-rolling was indicated in Table 2.

Next, the hot-rolled original sheets were pickled and then were subjected to the cold rolling at a reduction ratio of 40% or more and 80% or less such that the thickness after the cold rolling became 1.2 mm. However, with regard to steel types A17, E9, and J15, the reduction ratio of the cold rolling was less than 40%. In the cold rolling, the reduction ratio of each steel type is indicated in Table 3. Further, when the reduction ratio of the cold rolling was 80%, a rolling load became too high and thus the cold rolling could not be performed to a predetermined sheet thickness. Therefore, the substantial upper limit of the reduction ratio is about 80%.

Thereafter, the cold-rolled sheet (base steel sheet) was subjected to the heat treatment and the hot-dip galvanizing treatment in the continuous hot-dip galvanizing line.

In the continuous hot-dip galvanizing line, first, the cold-rolled sheet was heated to a temperature region of 750 or higher and 900° C. or lower, was held for 10 seconds or more and 600 seconds or less at the temperature region, and then was subjected to the annealing treatment. In addition, when the heating was performed up to the temperature region of 750 to 900° C., an average heating rate HR1 (° C./second) of room temperature or higher and 650° C. or lower was set to 0.3 or more (HR1≥0.3), and an average heating rate HR2 (° C./second) from above 650° C. to 750 to 900° C. was set to 0.5×HR1 or less (HR2≤0.5×HR1). Table 3 indicates the heating temperature (annealing temperature), the heating holding time (time to a primary cooling start after cold rolling) (second), and the average heating rates HR1 and HR2 (° C./second) of each steel type.

However, with respect to steel type A20, the annealing temperature exceeded 900° C. With respect to steel types A7, C4, E5, J5, and O4, the annealing temperature was less than 750° C. With respect to steel types C3, E6, and J5, the holding time was shorter than one second. With respect to steel types A18 and C13, the holding time exceeded 600 seconds. Further, with respect to steel type C12, the average heating rate HR1 was slower than 0.3 (° C./second). With respect to steel types A12, A13, A15, A15, C3, C4, C9, C11, J10, J11, J13, J14, and O10, the average heating rate HR2 (° C./second) exceeded 0.5×HR1.

After the annealing, the cooling was performed from the annealing temperature to 500° C. at the average cooling rate of 0.1 to 200° C./second. With respect to steel types A19 and C13, the average cooling rate was slower than 0.1° C./second. The average cooling rate (° C./second) of each steel sheet is indicated in Table 3.

After the cooling treatment, the holding was performed between 500 and 350° C. for 10 to 1000 seconds. The holding time of each steel sheet is indicated in Table 3. However, with respect to steel sheets A8, C5, J6, and O5, the holding time was less than 10 seconds.

Then, the base steel sheet was dipped in the hot-dip galvanizing bath controlled to a predetermined condition and then was cooled to the room temperature. The temperature of the galvanizing bath was managed to 440 to 470° C. In addition, when the hot-dip galvanizing was performed, the temperature of the base steel sheet was (temperature of hot-dip galvanizing bath−40)° C. or higher and (temperature of hot-dip galvanizing bath+50)° C. or lower. The effective Al concentration in the hot-dip galvanizing bath was in the range of 0.09 to 0.17 mass %. After being dipped in the hot-dip galvanizing bath, a part of the steel sheet was subjected to the alloying treatment at 460° C. or higher and 600° C. or lower and then was cooled to the room temperature. At that time, the weight per unit area was each about 35 g/m$^2$ on both surfaces. Finally, the obtained steel sheet was subjected to the skin pass rolling at the reduction ratio of 0.4%.

In order to suppress the plating and to promote the alloying, a jet flow of 10 m/min or more and 50 m/min or less was provided in the galvanizing bath. Table 3 indicates the speed (m/min) of the jet flow provided in the galvanizing bath and the alloying treatment temperature at the time of performing the hot-dip galvanizing on each of the steels. However, with respect to steel types A9, C5, C8, E7, J7, and O6, the speed of the jet flow provided in the galvanizing bath was slower than 10 m/min. In addition, with respect to steel types A11, C8, E9, J9, and O9, the alloying treatment temperature exceeded 600° C.

Table 4 indicates an average value of pole densities of orientation groups {100} <011> to {223} <110> and a pole density of a crystal orientation {332} <113> in a sheet thickness range of ⅝ to ⅜ from a steel sheet surface of each steel type, and volume fractions (structural fractions) (%) of ferrite, bainite, residual austenite, martensite, and pearlite in a metal structure of each steel type. In addition, each of the volume fractions (structural fractions) was evaluated by the structural fraction before the skin pass rolling. Further, Table 4 indicated, as mechanical properties of each steel type, the tensile strength TS (MPa), the elongation (L-El), the difference in elongation (ΔEl), the balance (TS×El) of the strength (TS)-total elongation (C-El). In addition, the presence or absence of galvanizing faults, Fe concentration (mass %) of the hot-dip galvanized layer, and Fe concentration (mass %) of the alloyed hot-dip galvanized layer are indicated.

The tensile test was performed by sampling a JIS No. 5 test piece from a sheet of 1.2 mm thick in a direction vertical to and parallel to the rolling direction to evaluate tensile properties. A difference (ΔEl) between an elongation (L-El) in the case of performing the tensile test in the direction parallel to the rolling direction and an elongation (C-El) in the case of performing the tensile test in the direction vertical to the rolling direction was calculated from the obtained elongation value. The tensile test was performed on each of five test pieces and an average value of values was obtained, so the elongation and TS were calculated from the average value. In addition, as for a steel sheet having large material anisotropy, there was a tendency that the elongation value was varied. A steel having the balance (TS×El) of the strength (TS)-the total elongation (C-El) exceeding 16000 (MPa·%) was defined as a high strength steel sheet having excellent formability.

The plating property and the alloying reaction were evaluated as follows, respectively.

○: No galvanizing fault is present.
Δ: Some galvanizing faults are present.
x: Numerous galvanizing faults are present.

The tensile property, the plating property, and the content (%) of Fe contained in the galvanized layer which were measured are indicated in Table 4. It was figured out that all of the steel sheets of the present invention were excellent in both of the formability and the plating property.

TABLE 1

| | | Chemical composition(mass %) | | | | | | | | |
|---|---|---|---|---|---|---|---|---|---|---|
| | Tl/° C. | C | Si | Mn | P | S | N | Al | Ti | Nb | B |
| A | 854 | 0.198 | 1.48 | 2.24 | 0.009 | 0.0032 | 0.0028 | 0.033 | 0.000 | 0.000 | 0 |
| B | 853 | 0.139 | 1.97 | 2.42 | 0.011 | 0.0029 | 0.0021 | 0.021 | 0.000 | 0.000 | 0 |
| C | 855 | 0.231 | 1.19 | 2.32 | 0.008 | 0.0024 | 0.0019 | 0.319 | 0.000 | 0.000 | 0 |
| D | 855 | 0.220 | 0.56 | 2.03 | 0.008 | 0.0022 | 0.0027 | 0.980 | 0.000 | 0.000 | 0 |
| E | 856 | 0.245 | 1.52 | 2.34 | 0.014 | 0.0019 | 0.0026 | 0.006 | 0.000 | 0.000 | 0 |
| F | 856 | 0.272 | 1.82 | 2.04 | 0.010 | 0.0042 | 0.0021 | 0.023 | 0.000 | 0.000 | 0 |
| G | 857 | 0.263 | 1.86 | 2.19 | 0.009 | 0.0039 | 0.0020 | 0.026 | 0.000 | 0.000 | 0 |
| H | 862 | 0.219 | 1.56 | 2.26 | 0.006 | 0.0035 | 0.0016 | 0.028 | 0.030 | 0.000 | 0 |
| I | 866 | 0.195 | 1.42 | 2.30 | 0.010 | 0.0036 | 0.0013 | 0.026 | 0.000 | 0.032 | 0 |
| J | 865 | 0.199 | 1.49 | 2.31 | 0.014 | 0.0019 | 0.0033 | 0.027 | 0.042 | 0.000 | 0.0022 |
| K | 856 | 0.249 | 1.86 | 2.29 | 0.019 | 0.0008 | 0.0045 | 0.024 | 0.000 | 0.000 | 0 |
| L | 859 | 0.242 | 1.99 | 2.02 | 0.011 | 0.0023 | 0.0021 | 0.026 | 0.000 | 0.000 | 0 |
| M | 862 | 0.266 | 1.72 | 2.33 | 0.008 | 0.0027 | 0.0027 | 0.028 | 0.000 | 0.000 | 0 |
| N | 874 | 0.275 | 1.76 | 2.03 | 0.019 | 0.0041 | 0.0021 | 0.712 | 0.032 | 0.011 | 0.0011 |
| O | 857 | 0.298 | 1.75 | 2.37 | 0.011 | 0.0009 | 0.0017 | 0.016 | 0.000 | 0.000 | 0 |
| P | 856 | 0.304 | 1.54 | 2.03 | 0.009 | 0.0010 | 0.0019 | 0.457 | 0.000 | 0.000 | 0 |
| Q | 860 | 0.329 | 0.98 | 2.89 | 0.013 | 0.0025 | 0.0022 | 0.004 | 0.000 | 0.000 | 0 |
| R | 891 | 0.273 | 1.56 | 1.89 | 0.012 | 0.0013 | 0.0023 | 0.032 | 0.000 | 0.000 | 0 |
| S | 857 | 0.385 | 1.19 | 1.92 | 0.011 | 0.0027 | 0.0034 | 0.005 | 0.000 | 0.000 | 0 |
| a | 866 | 0.623 | 1.19 | 2.56 | 0.012 | 0.0008 | 0.0022 | 0.024 | 0.000 | 0.000 | 0 |
| b | 851 | 0.071 | 0.55 | 1.95 | 0.009 | 0.0033 | 0.0025 | 0.021 | 0.000 | 0.000 | 0 |
| c | 853 | 0.185 | 0.23 | 1.76 | 0.019 | 0.0026 | 0.0011 | 0.016 | 0.000 | 0.000 | 0 |
| d | 852 | 0.176 | 0.54 | 1.22 | 0.033 | 0.0016 | 0.0009 | 0.024 | 0.000 | 0.000 | 0 |

| | Mg | Rem | Ca | Mo | Cr | Cu | Ni | V | Note |
|---|---|---|---|---|---|---|---|---|---|
| A | 0 | 0 | 0 | 0 | 0 | | | 0 | Inventive steel |
| B | 0 | 0 | 0 | 0 | 0 | | | 0 | Inventive steel |
| C | 0 | 0 | 0.004 | 0 | 0 | | | 0 | Inventive steel |
| D | 0 | 0 | 0 | 0 | 0 | | | 0 | Inventive steel |
| E | 0 | 0.007 | 0 | 0 | 0 | | | 0 | Inventive steel |
| F | 0 | 0 | 0 | 0 | 0 | | 0.59 | 0 | Inventive steel |
| G | 0 | 0 | 0 | 0 | 0.12 | | | 0 | Inventive steel |
| H | 0 | 0 | 0 | 0 | 0 | | | 0 | Inventive steel |
| I | 0 | 0 | 0 | 0 | 0 | | | 0 | Inventive steel |
| J | 0 | 0 | 0 | 0 | 0 | | | 0 | Inventive steel |
| K | 0.005 | 0 | 0 | 0 | 0 | | | 0 | Inventive steel |
| L | 0 | 0 | 0 | 0.04 | 0 | | | 0 | Inventive steel |
| M | 0 | 0 | 0 | 0 | 0 | | | 0.056 | Inventive steel |
| N | 0 | 0 | 0 | 0 | 0.68 | | | 0 | Inventive steel |
| O | 0 | 0 | 0 | 0 | 0 | | | 0 | Inventive steel |
| P | 0 | 0 | 0 | 0 | 0 | 0.45 | 0.19 | 0 | Inventive steel |
| Q | 0 | 0 | 0.005 | 0 | 0 | | | 0 | Inventive steel |
| R | 0 | 0 | 0 | 0.36 | 0 | | | 0 | Inventive steel |
| S | 0 | 0.004 | 0 | 0 | 0 | | | 0 | Inventive steel |
| a | 0 | 0 | 0 | 0 | 0 | | | 0 | Comparative steel |

TABLE 1-continued

| | | | Chemical composition(mass %) | | | | | | |
|---|---|---|---|---|---|---|---|---|---|
| b | 0 | 0 | 0 | 0 | 0 | | 0 | Comparative steel |
| c | 0 | 0 | 0 | 0 | 0 | | 0 | Comparative steel |
| d | 0 | 0 | 0 | 0 | 0 | | 0 | Comparative steel |

TABLE 2

| Steel type | Tl/° C. | Number of times of reduction of 40% or more at 1000° C. or higher and 1200° C. or lower | Reduction ratio of 40% or more at 1000° C. or higher and 1200° C. or lower | Austenite grain diameter after rough rolling/mm | Reduction ratio at Tl + 30° C. or higher and Tl + 200° C. or lower/% | Tf: Temperature after final reduction of 30% or more/° C. | Pl: Reduction ratio of final reduction of 30% or more/% |
|---|---|---|---|---|---|---|---|
| A1 | 854 | 2 | 45/45 | 160 | 85 | 984 | 45 |
| A2 | 854 | 0 | *1 | 230 | 80 | 923 | 40 |
| A3 | 854 | 2 | 45/45 | 130 | 35 | 942 | 30 |
| A4 | 854 | 2 | 45/45 | 140 | 80 | 899 | 40 |
| A5 | 854 | 1 | 50 | 120 | 80 | 826 | 40 |
| A6 | 854 | 1 | 50 | 110 | 80 | 912 | 40 |
| A7 | 854 | 1 | 50 | 120 | 80 | 906 | 40 |
| A8 | 854 | 2 | 45/45 | 130 | 80 | 912 | 40 |
| A9 | 854 | 2 | 45/45 | 150 | 80 | 895 | 40 |
| A10 | 854 | 2 | 45/45 | 140 | 80 | 920 | 40 |
| A11 | 854 | 2 | 45/45 | 140 | 80 | 950 | 40 |
| A12 | 854 | 2 | 45/45 | 160 | 80 | 872 | 40 |
| A13 | 854 | 2 | 45/45 | 160 | 80 | 890 | 40 |
| A14 | 854 | 2 | 45/45 | 160 | 80 | 893 | 40 |
| A15 | 854 | 2 | 45/45 | 160 | 80 | 905 | 40 |
| A16 | 854 | 2 | 45/45 | 160 | 80 | 899 | 40 |
| A17 | 854 | 2 | 45/45 | 160 | 80 | 904 | 40 |
| A18 | 854 | 2 | 45/45 | 165 | 80 | 905 | 40 |
| A19 | 854 | 2 | 45/45 | 160 | 80 | 899 | 40 |
| A20 | 854 | 2 | 45/45 | 170 | 80 | 904 | 40 |
| A21 | 854 | 2 | 45/45 | 170 | 80 | 889 | 40 |
| A22 | 854 | 2 | 45/45 | 170 | 80 | 972 | 40 |
| B1 | 853 | 2 | 45/45 | 150 | 75 | 935 | 40 |
| C1 | 855 | 2 | 45/45 | 140 | 85 | 966 | 45 |
| C2 | 855 | 0 | *1 | 250 | 80 | 850 | 40 |
| C3 | 855 | 2 | 45/45 | 150 | 20 | 862 | 30 |
| C4 | 855 | 2 | 45/45 | 160 | 80 | 823 | 40 |
| C5 | 855 | 2 | 45/45 | 160 | 80 | 895 | 30 |
| C6 | 855 | 2 | 45/45 | 150 | 80 | 905 | 45 |
| C7 | 855 | 1 | 50 | 130 | 80 | 878 | 40 |
| C8 | 855 | 1 | 50 | 120 | 80 | 942 | 30 |
| C9 | 855 | 2 | 45/45 | 140 | 80 | 923 | 40 |
| C10 | 855 | 2 | 45/45 | 140 | 80 | 895 | 40 |
| C11 | 855 | 2 | 45/45 | 140 | 80 | 900 | 40 |
| C12 | 855 | 2 | 45/45 | 140 | 80 | 913 | 40 |
| C13 | 855 | 2 | 45/45 | 150 | 80 | 893 | 40 |
| C14 | 855 | 2 | 45/45 | 140 | 80 | 924 | 30 |
| C15 | 855 | 2 | 45/45 | 140 | 80 | 886 | 30 |
| C16 | 855 | 2 | 45/45 | 140 | 80 | 956 | 30 |
| D1 | 855 | 1 | 50 | 120 | 85 | 963 | 40 |
| D2 | 855 | 2 | 45/45 | 120 | 80 | 932 | 40 |
| E1 | 856 | 2 | 45/45 | 150 | 80 | 908 | 45 |
| E2 | 856 | 0 | *1 | 290 | 80 | 911 | 40 |
| E3 | 856 | 1 | 50 | 160 | 20 | 905 | 35 |
| E4 | 856 | 2 | 45/45 | 150 | 80 | 895 | 40 |
| E5 | 856 | 2 | 45/45 | 140 | 80 | 905 | 40 |
| E6 | 856 | 2 | 45/45 | 120 | 80 | 921 | 45 |
| E7 | 856 | 2 | 45/45 | 130 | 80 | 906 | 40 |
| E8 | 856 | 2 | 45/45 | 120 | 80 | 897 | 40 |
| E9 | 856 | 2 | 45/45 | 130 | 80 | 920 | 40 |
| E10 | 856 | 2 | 45/45 | 120 | 80 | 915 | 40 |
| E11 | 856 | 2 | 45/45 | 120 | 80 | 890 | 30 |
| E12 | 856 | 2 | 45/45 | 120 | 80 | 942 | 40 |
| E13 | 856 | 2 | 45/45 | 120 | 80 | 983 | 40 |
| F1 | 856 | 2 | 45/45 | 140 | 95 | 916 | 40 |
| F2 | 856 | 2 | 45/45 | 150 | 80 | 932 | 40 |
| G1 | 857 | 3 | 40/40/40 | 160 | 90 | 926 | 45 |
| G2 | 857 | 2 | 45/45 | 160 | 80 | 930 | 40 |
| H1 | 862 | 2 | 45/45 | 150 | 85 | 942 | 40 |
| H3 | 862 | 2 | 45/45 | 140 | 85 | 895 | 40 |

TABLE 2-continued

| | | | | | | | |
|---|---|---|---|---|---|---|---|
| I1 | 866 | 2 | 45/45 | 150 | 80 | 936 | 40 |
| I2 | 866 | 2 | 45/45 | 150 | 80 | 934 | 45 |
| J1 | 865 | 3 | 40/40/40 | 160 | 80 | 955 | 35 |
| J2 | 865 | <u>0</u> | *1 | <u>230</u> | 85 | 940 | 40 |
| J3 | 865 | 1 | 50 | 150 | <u>15</u> | 955 | 30 |
| J4 | 865 | 1 | 50 | 130 | 85 | 934 | 35 |
| J5 | 865 | 1 | 50 | 120 | 85 | 945 | 35 |
| J6 | 865 | 2 | 45/45 | 160 | 85 | 926 | 40 |
| J7 | 865 | 2 | 45/45 | 150 | 85 | 943 | 40 |
| J8 | 865 | 2 | 45/45 | 140 | 85 | 930 | 40 |
| J9 | 865 | 2 | 45/45 | 130 | 85 | 925 | 40 |
| J10 | 865 | 2 | 45/45 | 160 | 80 | 960 | 40 |
| J11 | 865 | 2 | 45/45 | 160 | 80 | 960 | 40 |
| J12 | 865 | 2 | 45/45 | 160 | 80 | 965 | 40 |
| J13 | 865 | 2 | 45/45 | 160 | 80 | 950 | 40 |
| J14 | 865 | 2 | 45/45 | 150 | 80 | 945 | 40 |
| J15 | 865 | 2 | 45/45 | 160 | 80 | 945 | 40 |
| K1 | 856 | 3 | 40/40/40 | 150 | 75 | 921 | 40 |
| L1 | 859 | 2 | 45/45 | 120 | 90 | 944 | 45 |
| M1 | 862 | 1 | 50 | 130 | 85 | 908 | 40 |
| N1 | 874 | 2 | 45/45 | 130 | 80 | 906 | 45 |
| O1 | 857 | 2 | 45/45 | 160 | 75 | 922 | 45 |
| O2 | 857 | <u>0</u> | *1 | <u>250</u> | 85 | 915 | 45 |
| O3 | 857 | 1 | 50 | 130 | <u>20</u> | 823 | 30 |
| O4 | 857 | 1 | 50 | 140 | 80 | 905 | 40 |
| O5 | 857 | 1 | 50 | 150 | 80 | 892 | 45 |
| O6 | 857 | 2 | 45/45 | 160 | 80 | 904 | 45 |
| O7 | 857 | 2 | 45/45 | 140 | 75 | 906 | 40 |
| O8 | 857 | 2 | 45/45 | 120 | 75 | 910 | 40 |
| O9 | 857 | 2 | 45/45 | 130 | 80 | 910 | 45 |
| O10 | 857 | 2 | 45/45 | 160 | 75 | 920 | 40 |
| O11 | 857 | 2 | 45/45 | 160 | 75 | 900 | 40 |
| O12 | 857 | 2 | 45/45 | 160 | 75 | 893 | 40 |
| P1 | 856 | 2 | 45/45 | 160 | 60 | 930 | 40 |
| Q1 | 860 | 2 | 45/45 | 140 | 80 | 940 | 45 |
| R1 | 891 | 1 | 50 | 150 | 90 | 925 | 40 |
| S1 | 857 | 2 | 45/45 | 120 | 70 | 906 | 40 |
| a1 | 866 | 2 | 45/45 | 160 | 50 | 899 | 45 |
| b1 | 851 | 1 | 50 | 150 | 80 | 924 | 40 |
| c1 | 853 | 2 | 45/45 | 120 | 75 | 905 | 40 |
| d1 | 852 | 2 | 45/45 | 160 | 90 | 923 | 40 |

| Steel type | Reduction ratio at T1 to less than T1 + 30° C./% | t1 | 2.5 × t1 | t: waiting time/s | t/t1 | After hot rolling- finish cooling rate/ ° C./s | After hot rolling- finish cooling amount/ ° C. | Coiling temperature/ ° C. |
|---|---|---|---|---|---|---|---|---|
| A1 | 0 | 0.14 | 0.36 | 0.30 | 2.11 | 60 | 60 | 620 |
| A2 | 0 | 0.86 | 2.16 | 1.50 | 1.74 | 50 | 80 | 630 |
| A3 | 0 | 0.93 | 2.32 | 0.60 | 0.65 | 80 | 80 | 620 |
| A4 | <u>45</u> | 1.48 | 3.69 | 1.10 | 0.74 | 120 | 80 | 650 |
| A5 | 0 | 4.47 | 11.18 | 0.80 | 0.18 | 160 | 100 | 520 |
| A6 | 0 | 1.12 | 2.80 | <u>10.00</u> | 8.91 | 80 | 140 | 560 |
| A7 | 10 | 1.28 | 3.20 | 2.00 | 1.56 | 90 | 60 | 675 |
| A8 | 0 | 1.12 | 2.80 | 0.50 | 0.45 | 60 | 80 | 480 |
| A9 | 0 | 1.60 | 3.99 | 0.60 | 0.38 | 70 | 100 | 620 |
| A10 | 0 | 0.93 | 2.33 | 1.00 | 1.07 | 50 | 70 | 590 |
| A11 | 10 | 0.40 | 0.99 | 0.90 | 2.28 | 80 | 40 | 630 |
| A12 | 0 | 2.39 | 5.96 | 0.30 | 0.13 | 120 | 60 | 590 |
| A13 | 0 | 1.75 | 4.38 | 0.30 | 0.17 | 190 | 100 | 600 |
| A14 | 0 | 1.66 | 4.15 | 1.50 | 0.90 | 200 | 120 | 610 |
| A15 | 0 | 1.31 | 3.27 | 2.40 | 1.84 | 160 | 140 | 590 |
| A16 | 0 | 1.48 | 3.69 | 0.90 | 0.61 | 150 | 100 | 580 |
| A17 | 0 | 1.33 | 3.33 | 1.50 | 1.12 | 100 | 80 | 630 |
| A18 | 0 | 1.31 | 3.27 | 2.40 | 1.84 | 80 | 80 | 600 |
| A19 | 0 | 1.48 | 3.69 | 1.20 | 0.81 | 60 | 60 | 590 |
| A20 | 0 | 1.33 | 3.33 | 1.50 | 1.12 | 70 | 40 | 590 |
| A21 | 0 | 1.79 | 4.47 | 0.60 | 0.34 | 160 | <u>210</u> | 550 |
| A22 | 0 | 0.19 | 0.46 | 0.30 | 1.61 | <u>3</u> | <u>25</u> | 600 |
| B1 | 0 | 0.60 | 1.51 | 0.60 | 1.00 | 50 | 50 | 620 |
| C1 | 0 | 0.15 | 0.38 | 0.35 | 2.31 | 80 | 70 | 600 |
| C2 | 0 | 3.34 | 8.35 | 1.00 | 0.30 | 90 | 80 | 620 |
| C3 | 0 | 2.89 | 7.22 | 0.80 | 0.28 | 130 | 110 | 590 |
| C4 | <u>70</u> | 4.68 | 11.70 | <u>15.00</u> | 3.20 | 80 | 80 | 600 |
| C5 | 0 | 1.95 | 4.87 | 1.00 | 0.51 | 90 | 50 | 590 |
| C6 | 0 | 1.17 | 2.91 | 0.80 | 0.69 | 100 | 50 | 620 |
| C7 | 0 | 2.20 | 5.49 | 0.50 | 0.23 | 70 | 60 | 640 |

TABLE 2-continued

| | | | | | | | | |
|---|---|---|---|---|---|---|---|---|
| C8  | 0  | 0.94 | 2.36  | 1.00  | 1.06 | 110 | 80  | 720 |
| C9  | 15 | 0.88 | 2.21  | 0.60  | 0.68 | 100 | 100 | 565 |
| C10 | 0  | 1.62 | 4.06  | 1.20  | 0.74 | 120 | 90  | 580 |
| C11 | 0  | 1.47 | 3.68  | 0.60  | 0.41 | 100 | 70  | 600 |
| C12 | 0  | 1.12 | 2.80  | 0.60  | 0.54 | 80  | 60  | 590 |
| C13 | 0  | 1.69 | 4.22  | 0.60  | 0.36 | 110 | 50  | 620 |
| C14 | 0  | 1.28 | 3.20  | 0.60  | 0.47 | 80  | 40  | 600 |
| C15 | 0  | 2.18 | 5.46  | 0.50  | 0.23 | 80  | <u>190</u> | 520 |
| C16 | 0  | 0.72 | 1.80  | 1.30  | 1.80 | <u>5</u> | <u>10</u> | 610 |
| D1  | 0  | 0.26 | 0.64  | 0.49  | 1.91 | 70  | 120 | 590 |
| D2  | 0  | 0.68 | 1.71  | 0.60  | 0.88 | 60  | 90  | 580 |
| E1  | 0  | 1.09 | 2.73  | 1.00  | 0.92 | 170 | 80  | 620 |
| E2  | 0  | 1.18 | 2.95  | 0.30  | 0.25 | 80  | 90  | 630 |
| E3  | 10 | 1.52 | 3.80  | 0.50  | 0.33 | 90  | 80  | 620 |
| E4  | 0  | 1.64 | 4.09  | <u>16.00</u> | 9.78 | 120 | 40  | 600 |
| E5  | 0  | 1.34 | 3.36  | 1.00  | 0.75 | 160 | 60  | 590 |
| E6  | 0  | 0.76 | 1.91  | 0.40  | 0.52 | 130 | 80  | 620 |
| E7  | 0  | 1.31 | 3.29  | 0.40  | 0.30 | 80  | 90  | 630 |
| E8  | 0  | 1.58 | 3.94  | 0.60  | 0.38 | 70  | 50  | 580 |
| E9  | 0  | 0.96 | 2.40  | 0.60  | 0.62 | 90  | 70  | 590 |
| E10 | 0  | 1.08 | 2.70  | 0.60  | 0.56 | 90  | 120 | 610 |
| E11 | 0  | 2.09 | 5.22  | 0.80  | 0.38 | 120 | <u>230</u> | 640 |
| E12 | 0  | 0.53 | 1.33  | 1.30  | 2.45 | 50  | <u>20</u> | 590 |
| E13 | 0  | 0.14 | 0.36  | 0.60  | 4.20 | <u>5</u> | <u>20</u> | 610 |
| F1  | 0  | 1.05 | 2.63  | 0.80  | 0.76 | 120 | 130 | 630 |
| F2  | 0  | 0.70 | 1.76  | 0.40  | 0.57 | 110 | 100 | 620 |
| G1  | 0  | 0.68 | 1.70  | 1.20  | 1.77 | 80  | 100 | 590 |
| G2  | 0  | 0.77 | 1.92  | 0.40  | 0.52 | 130 | 80  | 620 |
| H1  | 20 | 0.64 | 1.61  | 0.60  | 0.93 | 160 | 90  | 630 |
| H3  | 0  | 1.85 | 4.63  | 0.30  | 0.16 | 120 | 80  | 650 |
| I1  | 0  | 0.83 | 2.06  | 0.70  | 0.85 | 80  | 60  | 630 |
| I2  | 0  | 0.69 | 1.74  | 0.30  | 0.43 | 60  | 110 | 650 |
| J1  | 0  | 0.66 | 1.66  | 1.10  | 1.66 | 80  | 70  | 590 |
| J2  | 20 | 0.74 | 1.84  | 0.60  | 0.82 | 110 | 80  | 600 |
| J3  | 0  | 0.89 | 2.23  | 0.40  | 0.45 | 100 | 90  | 620 |
| J4  | 0  | 1.06 | 2.64  | <u>4.40</u> | 4.16 | 130 | 70  | 630 |
| J5  | 0  | 0.84 | 2.09  | 0.50  | 0.60 | 80  | 100 | 590 |
| J6  | 20 | 1.04 | 2.61  | 1.00  | 0.96 | 60  | 120 | 580 |
| J7  | 10 | 0.68 | 1.69  | 0.60  | 0.89 | 70  | 80  | 600 |
| J8  | 0  | 0.95 | 2.37  | 0.80  | 0.84 | 50  | 90  | 620 |
| J9  | 20 | 1.07 | 2.67  | 1.20  | 1.13 | 60  | 120 | 620 |
| J10 | 0  | 0.41 | 1.01  | 1.60  | 3.95 | 90  | 100 | 510 |
| J11 | 0  | 0.41 | 1.01  | 1.00  | 2.47 | 120 | 80  | 550 |
| J12 | 0  | 0.34 | 0.86  | 1.10  | 3.21 | 100 | 60  | 590 |
| J13 | 0  | 0.55 | 1.39  | 1.10  | 1.98 | 90  | 60  | 570 |
| J14 | 0  | 0.64 | 1.60  | 1.10  | 1.72 | 150 | 90  | 490 |
| J15 | 0  | 0.64 | 1.60  | 1.10  | 1.72 | 160 | 70  | 580 |
| K1  | 0  | 0.94 | 2.34  | 0.80  | 0.85 | 80  | 60  | 550 |
| L1  | 0  | 0.39 | 0.98  | 0.60  | 1.53 | 60  | 80  | 520 |
| M1  | 10 | 1.43 | 3.57  | 0.50  | 0.35 | 50  | 40  | 480 |
| N1  | 0  | 1.75 | 4.37  | 0.80  | 0.46 | 160 | 120 | 620 |
| O1  | 0  | 0.77 | 1.92  | 1.00  | 1.30 | 50  | 90  | 620 |
| O2  | 0  | 0.94 | 2.35  | 0.60  | 0.64 | 170 | 90  | 480 |
| O3  | 0  | 4.32 | 10.80 | <u>16.00</u> | 3.70 | 60  | 70  | 590 |
| O4  | 0  | 1.38 | 3.45  | 1.00  | 0.73 | 80  | 60  | 590 |
| O5  | 0  | 1.63 | 4.09  | 0.40  | 0.24 | 90  | 140 | 560 |
| O6  | 0  | 1.25 | 3.11  | 0.50  | 0.40 | 110 | 130 | 570 |
| O7  | 0  | 1.35 | 3.38  | 2.10  | 1.55 | 120 | 100 | 570 |
| O8  | 0  | 1.24 | 3.10  | 0.60  | 0.48 | 80  | 80  | 580 |
| O9  | 0  | 1.07 | 2.68  | 0.30  | 0.28 | 60  | 70  | 610 |
| O10 | 0  | 0.99 | 2.48  | 1.00  | 1.01 | 60  | 90  | 580 |
| O11 | 0  | 1.52 | 3.81  | 0.60  | 0.39 | 120 | 120 | 600 |
| O12 | 0  | 1.74 | 4.35  | 0.60  | 0.34 | 180 | 70  | 600 |
| P1  | 0  | 0.75 | 1.88  | 0.20  | 0.27 | 200 | 60  | 590 |
| Q1  | 0  | 0.46 | 1.16  | 0.30  | 0.65 | 60  | 40  | 580 |
| R1  | 0  | 1.81 | 4.52  | 0.90  | 0.50 | 80  | 90  | 430 |
| S1  | 0  | 1.36 | 3.40  | 1.10  | 0.81 | 60  | 140 | 540 |
| a1  | 0  | 1.70 | 4.26  | 0.40  | 0.24 | 80  | 80  | 680 |
| b1  | 0  | 0.78 | 1.95  | 0.60  | 0.77 | 60  | 60  | 430 |
| c1  | 0  | 1.27 | 3.18  | 0.90  | 0.71 | 70  | 80  | 620 |
| d1  | 0  | 0.81 | 2.04  | 1.10  | 1.35 | 60  | 70  | 580 |

Underlines indicate that a numeral value is out of the range of the present invention.
*1: indicate cases where the reduction of 40% or more is not performed at 1000° C. or higher.

TABLE 3

| Steel type | Cold rolling ratio/% | Average heating rate of temperature region of 650° C. or higher: HR1/ ° C./s | Average heating rate from above 650° C. to annealing temperature: HR2/ ° C./s | Holding time during annealing/ ° C. | Holding time during annealing/s | Average cooling rate from annealing to 500° C./ ° C./s | Holding time at 350 to 500° C./s | Jet-flow rate in galvanizing bath/ m/min | Alloying temperature/ ° C. |
|---|---|---|---|---|---|---|---|---|---|
| A1 | 60 | 5.50 | 2.20 | 820 | 90 | 4 | 35 | 20 | —*2 |
| A2 | 60 | 5.50 | 2.20 | 820 | 90 | 4 | 30 | 20 | —*2 |
| A3 | 60 | 5.50 | 2.20 | 820 | 80 | 4 | 30 | 20 | —*2 |
| A4 | 60 | 5.50 | 2.20 | 810 | 60 | 4 | 60 | 20 | —*2 |
| A5 | 60 | 5.50 | 2.20 | 800 | 90 | 4 | 30 | 20 | —*2 |
| A6 | 60 | 5.50 | 2.20 | 800 | 60 | 4 | 90 | 20 | —*2 |
| A7 | 73 | 5.50 | 1.40 | 720 | 60 | 4 | 30 | 20 | —*2 |
| A8 | 40 | 5.50 | 2.20 | 800 | 60 | 4 | 5 | 20 | —*2 |
| A9 | 50 | 5.50 | 2.20 | 810 | 60 | 4 | 30 | 4 | —*2 |
| A10 | 73 | 5.50 | 2.20 | 820 | 60 | 4 | 20 | 25 | 540 |
| A11 | 60 | 5.50 | 2.20 | 800 | 60 | 4 | 30 | 35 | 620 |
| A12 | 60 | 5.50 | 10.00 | 810 | 90 | 4 | 30 | 20 | 490 |
| A13 | 60 | 5.50 | 5.50 | 810 | 90 | 4 | 30 | 20 | 490 |
| A14 | 60 | 5.50 | 1.00 | 820 | 90 | 4 | 30 | 20 | 500 |
| A15 | 60 | 2.20 | 2.20 | 810 | 90 | 4 | 30 | 20 | 490 |
| A16 | 60 | 1.10 | 2.20 | 820 | 90 | 4 | 30 | 20 | 500 |
| A17 | 20 | 5.50 | 1.00 | 820 | 120 | 4 | 30 | 15 | 510 |
| A18 | 60 | 0.20 | 0.08 | 810 | 2500 | 4 | 50 | 20 | 520 |
| A19 | 60 | 5.50 | 1.00 | 820 | 90 | 0.1 | 50 | 20 | 490 |
| A20 | 60 | 5.50 | 1.00 | 940 | 120 | 4 | 60 | 20 | 580 |
| A21 | 60 | 5.50 | 1.00 | 800 | 90 | 4 | 60 | 20 | 500 |
| A22 | 60 | 5.50 | 1.00 | 810 | 90 | 4 | 30 | 20 | 540 |
| B1 | 40 | 5.50 | 2.20 | 800 | 30 | 4 | 30 | 20 | —*2 |
| C1 | 60 | 5.50 | 2.20 | 820 | 60 | 4 | 30 | 20 | —*2 |
| C2 | 60 | 5.50 | 2.20 | 800 | 60 | 5 | 30 | 20 | —*2 |
| C3 | 60 | 5.50 | 5.50 | 760 | 5 | 10 | 180 | 20 | —*2 |
| C4 | 60 | 5.50 | 5.50 | 710 | 60 | 4 | 30 | 20 | —*2 |
| C5 | 60 | 5.50 | 2.20 | 820 | 60 | 4 | 5 | 3 | —*2 |
| C6 | 60 | 5.50 | 2.20 | 840 | 60 | 4 | 120 | 12 | 490 |
| C7 | 60 | 5.50 | 2.20 | 820 | 60 | 4 | 45 | 15 | 540 |
| C8 | 60 | 5.50 | 2.20 | 820 | 60 | 4 | 45 | 2 | 630 |
| C9 | 60 | 2.40 | 12.60 | 810 | 60 | 4 | 30 | 20 | 490 |
| C10 | 60 | 5.50 | 1.60 | 810 | 60 | 4 | 30 | 20 | 490 |
| C11 | 60 | 10.60 | 10.60 | 810 | 60 | 4 | 30 | 20 | 500 |
| C12 | 60 | 0.24 | 0.08 | 820 | 90 | 4 | 50 | 15 | 490 |
| C13 | 60 | 5.50 | 2.20 | 810 | 1300 | 0.1 | 50 | 20 | 510 |
| C14 | 60 | 5.50 | 2.20 | 930 | 120 | 4 | 50 | 20 | 570 |
| C15 | 60 | 5.50 | 2.20 | 790 | 60 | 4 | 30 | 15 | 520 |
| C16 |  | 5.50 | 2.20 | 810 | 200 | 1 | 60 | 15 | 560 |
| D1 | 60 | 5.50 | 2.20 | 850 | 50 | 5 | 60 | 15 | —*2 |
| D2 | 60 | 5.50 | 2.20 | 840 | 60 | 7 | 30 | 10 | 510 |
| E1 | 60 | 5.50 | 2.20 | 820 | 60 | 4 | 240 | 20 | —*2 |
| E2 | 50 | 5.50 | 2.20 | 820 | 60 | 2 | 15 | 10 | —*2 |
| E3 | 50 | 5.50 | 2.20 | 840 | 60 | 3 | 30 | 15 | —*2 |
| E4 | 50 | 5.50 | 2.20 | 800 | 60 | 3 | 30 | 15 | —*2 |
| E5 | 50 | 5.50 | 2.20 | 730 | 60 | 1 | 30 | 20 | —*2 |
| E6 | 50 | 5.50 | 2.20 | 770 | 5 | 1 | 20 | 20 | —*2 |
| E7 | 50 | 5.50 | 2.20 | 830 | 60 | 1 | 60 | 7 | —*2 |
| E8 | 40 | 5.50 | 2.20 | 860 | 30 | 1 | 70 | 15 | 560 |
| E9 | 40 | 5.50 | 2.20 | 800 | 30 | 2 | 300 | 10 | 620 |
| E10 | 20 | 5.50 | 2.20 | 810 | 90 | 2 | 60 | 10 | 510 |
| E11 | 40 | 5.50 | 2.20 | 820 | 60 | 4 | 30 | 20 | 490 |
| E12 | 40 | 5.50 | 2.20 | 810 | 130 | 4 | 40 | 15 | 520 |
| E13 | 40 | 5.50 | 2.20 | 820 | 60 | 4 | 80 | 20 | 550 |
| F1 | 60 | 5.50 | 2.20 | 780 | 90 | 3 | 30 | 20 | —*2 |
| F2 | 50 | 5.50 | 2.20 | 790 | 60 | 1 | 60 | 45 | 510 |
| G1 | 50 | 5.50 | 2.20 | 790 | 60 | 2 | 30 | 25 | —*2 |
| G2 | 50 | 5.50 | 2.20 | 790 | 90 | 1 | 70 | 20 | 520 |
| H1 | 55 | 5.50 | 2.20 | 800 | 30 | 2 | 30 | 35 | —*2 |
| H3 | 50 | 5.50 | 2.20 | 790 | 80 | 1 | 70 | 45 | 530 |
| I1 | 60 | 5.50 | 2.20 | 790 | 50 | 2 | 30 | 20 | —*2 |
| I2 | 60 | 5.50 | 2.20 | 800 | 45 | 1 | 70 | 30 | 530 |
| J1 | 60 | 3.80 | 1.40 | 820 | 60 | 2 | 30 | 20 | —*2 |
| J2 | 50 | 3.80 | 1.40 | 780 | 90 | 1 | 60 | 15 | —*2 |
| J3 | 50 | 3.80 | 1.40 | 780 | 90 | 1 | 60 | 20 | —*2 |
| J4 | 50 | 3.80 | 1.40 | 790 | 90 | 1 | 30 | 25 | —*2 |
| J5 | 50 | 3.80 | 1.40 | 720 | 5 | 2 | 30 | 20 | —*2 |
| J6 | 50 | 3.80 | 1.40 | 800 | 90 | 2 | 4 | 20 | —*2 |
| J7 | 50 | 3.80 | 1.40 | 800 | 90 | 1 | 30 | 3 | —*2 |
| J8 | 50 | 3.80 | 1.40 | 780 | 90 | 1 | 30 | 20 | 490 |
| J9 | 50 | 3.80 | 1.40 | 790 | 90 | 1 | 30 | 25 | 640 |

TABLE 3-continued

| Steel type | Cold rolling ratio/% | Average heating rate of temperature region of 650° C. or higher: HR1/ ° C./s | Average heating rate from above 650° C. to annealing temperature: HR2/ ° C./s | Holding time during annealing/ ° C. | Holding time during annealing/s | Average cooling rate from annealing to 500° C./ ° C./s | Holding time at 350 to 500° C. ° C./s | Jet-flow rate in galvanizing bath/ m/min | Alloying temperature/ ° C. |
|---|---|---|---|---|---|---|---|---|---|
| J10 | 50 | <u>3.80</u> | <u>5.00</u> | 800 | 90 | 1 | 30 | 20 | 500 |
| J11 | 50 | <u>3.80</u> | <u>3.80</u> | 800 | 90 | 1 | 30 | 20 | 490 |
| J12 | 50 | 3.80 | 0.80 | 810 | 90 | 1 | 30 | 20 | 480 |
| J13 | 50 | <u>2.20</u> | <u>2.20</u> | 800 | 90 | 1 | 30 | 20 | 490 |
| J14 | 50 | <u>1.00</u> | <u>2.20</u> | 810 | 90 | 1 | 30 | 20 | 470 |
| J15 | <u>20</u> | 3.80 | 0.80 | 810 | 90 | 1 | 30 | 20 | 520 |
| K1 | 60 | 5.50 | 2.20 | 800 | 40 | 2 | 60 | 10 | —*2 |
| L1 | 60 | 5.50 | 2.20 | 840 | 30 | 2 | 300 | 20 | —*2 |
| M1 | 60 | 5.50 | 2.20 | 820 | 50 | 2 | 30 | 15 | —*2 |
| N1 | 40 | 5.50 | 2.20 | 810 | 50 | 2 | 30 | 20 | —*2 |
| O1 | 40 | 5.50 | 2.20 | 830 | 60 | 2 | 30 | 10 | —*2 |
| O2 | 40 | 5.50 | 2.20 | 810 | 90 | 1 | 30 | 20 | —*2 |
| O3 | 50 | 5.50 | 2.20 | 790 | 90 | 2 | 30 | 20 | —*2 |
| O4 | 50 | 5.50 | 2.20 | <u>690</u> | 90 | 1 | 30 | 20 | —*2 |
| O5 | 50 | 5.50 | 2.20 | 810 | 90 | 2 | <u>4</u> | 20 | —*2 |
| O6 | 60 | 5.50 | 2.20 | 810 | 90 | 2 | 30 | <u>5</u> | —*2 |
| O7 | 60 | 5.50 | 2.20 | 810 | 90 | 2 | 60 | 45 | 490 |
| O8 | 60 | 5.50 | 2.20 | 800 | 90 | 2 | 30 | 20 | 530 |
| O9 | 60 | 5.50 | 2.20 | 800 | 90 | 2 | 30 | 15 | <u>640</u> |
| O10 | 50 | <u>5.50</u> | <u>10.00</u> | 800 | 90 | 1 | 30 | 20 | 490 |
| O11 | 50 | 1.00 | 2.20 | 790 | 120 | 1 | 30 | 20 | 480 |
| O12 | 50 | 5.50 | 2.20 | <u>930</u> | 90 | 2 | 30 | 20 | 490 |
| P1 | 40 | 5.50 | 2.20 | 800 | 30 | 2 | 30 | 20 | —*2 |
| Q1 | 50 | 5.50 | 2.20 | 790 | 50 | 2 | 30 | 20 | —*2 |
| R1 | 50 | 5.50 | 2.20 | 830 | 60 | 2 | 60 | 40 | —*2 |
| S1 | 50 | 5.50 | 2.20 | 820 | 30 | 2 | 240 | 20 | —*2 |
| a1 | 40 | 5.50 | 2.20 | 820 | 50 | 2 | 30 | 30 | —*2 |
| b1 | 73 | 5.50 | 2.20 | 800 | 30 | 16 | 30 | 20 | —*2 |
| c1 | 50 | 5.50 | 2.20 | 810 | 60 | 2 | 30 | 20 | —*2 |
| d1 | 60 | 5.50 | 2.20 | 790 | 30 | 2 | 30 | 20 | —*2 |

Underlines indicate that a numeral value is out of the range of the present invention.
*2: indicate cases where the alloying treatment is not performed.

TABLE 4

| Steel type | Pole density of orientation groups {100}<011> to {223}<110> | Pole density of {332}<113> | F/% | B/% | Residual γ/% | M/% | P/% | TS/MPa | C-El./% |
|---|---|---|---|---|---|---|---|---|---|
| A1 | 2.6 | 2.5 | 52 | 26 | 19 | 3 | 0 | 1035 | 24 |
| A2 | <u>7.1</u> | <u>5.6</u> | 53 | 24 | 21 | 2 | 0 | 995 | 18 |
| A3 | <u>6.7</u> | <u>6.2</u> | 56 | 21 | 20 | 3 | 0 | 990 | 17 |
| A4 | <u>6.6</u> | <u>6.2</u> | 55 | 21 | 22 | 2 | 0 | 1020 | 18 |
| A5 | <u>6.8</u> | <u>5.8</u> | 52 | 24 | 19 | 5 | 0 | 1005 | 16 |
| A6 | <u>7.2</u> | <u>5.9</u> | 53 | 27 | 20 | 0 | 0 | 980 | 17 |
| A7 | 2.1 | 2.1 | 100*1 | 0 | 0 | 0 | 0 | <u>724</u> | 18 |
| A8 | 2.2 | 1.9 | 54 | 22 | 21 | 3 | 0 | 1075 | 13 |
| A9 | 1.9 | 3.2 | 53 | 25 | 20 | 2 | 0 | 995 | 24 |
| A10 | 2.3 | 2.2 | 53 | 25 | 21 | 1 | 0 | 995 | 23 |
| A11 | 2.3 | 2.3 | 53 | 25 | 0 | 0 | 22 | 980 | 21 |
| A12 | <u>7.2</u> | <u>5.9</u> | 53 | 27 | 18 | 2 | 0 | 1026 | 22 |
| A13 | <u>6.3</u> | <u>5.4</u> | 52 | 28 | 19 | 1 | 0 | 1028 | 21 |
| A14 | 1.9 | 1.4 | 54 | 27 | 18 | 1 | 0 | 1008 | 24 |
| A15 | <u>5.7</u> | <u>5.2</u> | 53 | 28 | 17 | 2 | 0 | 1025 | 22 |
| A16 | <u>6.1</u> | <u>5.7</u> | 53 | 27 | 18 | 2 | 0 | 1030 | 22 |
| A17 | <u>6.3</u> | <u>5.2</u> | 52 | 28 | 18 | 2 | 0 | 1038 | 15 |
| A18 | 1.4 | 1.3 | 50 | 27 | 9 | 13 | 0 | <u>934</u> | 23 |
| A19 | 2.1 | 2.0 | 79 | 0 | <u>2</u> | 0 | <u>19</u> | 842 | 21 |
| A20 | 1.9 | 1.6 | 0 | 57 | 9 | 26 | 8 | 1078 | 7 |
| A21 | 5.6 | 5.4 | 53 | 31 | 13 | 3 | 0 | 1045 | 21 |
| A22 | 2.3 | 1.6 | 54 | 35 | 9 | 2 | 0 | 1021 | 13 |
| B1 | 2.1 | 2.6 | 55 | 25 | 19 | 1 | 0 | 1010 | 23 |
| C1 | 3.0 | 2.5 | 53 | 27 | 19 | 1 | 0 | 1000 | 24 |

TABLE 4-continued

| | | | | | | | | | |
|---|---|---|---|---|---|---|---|---|---|
| C2 | 6.8 | 6.2 | 57 | 22 | 21 | 0 | 0 | 995 | 18 |
| C3 | 7.0 | 5.9 | 74*1 | 14 | 12 | 0 | 0 | 785 | 17 |
| C4 | 6.9 | 6.0 | 100*1 | 0 | 0 | 0 | 0 | 705 | 17 |
| C5 | 2.9 | 1.9 | 54 | 10 | 18 | 18 | 0 | 1105 | 14 |
| C6 | 2.2 | 2.4 | 53 | 23 | 23 | 1 | 0 | 995 | 22 |
| C7 | 2.6 | 2.1 | 55 | 20 | 17 | 5 | 3 | 1035 | 19 |
| C8 | 2.8 | 2.1 | 56 | 22 | 0 | 0 | 22 | 875 | 16 |
| C9 | 6.4 | 6.7 | 56 | 23 | 19 | 2 | 0 | 1052 | 19 |
| C10 | 1.7 | 1.3 | 55 | 24 | 20 | 1 | 0 | 1008 | 22 |
| C11 | 7.8 | 6.9 | 56 | 23 | 20 | 1 | 0 | 1098 | 19 |
| C12 | 1.5 | 1.3 | 51 | 22 | 16 | 11 | 0 | 916 | 19 |
| C13 | 1.8 | 1.5 | 76 | 5 | 3 | 0 | 16 | 819 | 20 |
| C14 | 1.6 | 1.4 | 0 | 57 | 9 | 34 | 0 | 1016 | 8 |
| C15 | 5.9 | 5.2 | 59 | 26 | 13 | 2 | 0 | 1086 | 17 |
| C16 | 1.6 | 1.3 | 52 | 35 | 10 | 3 | 0 | 994 | 14 |
| D1 | 2.6 | 3.2 | 54 | 25 | 21 | 0 | 0 | 985 | 26 |
| D2 | 2.4 | 2.7 | 53 | 26 | 21 | 0 | 0 | 990 | 25 |
| E1 | 3.2 | 2.4 | 46 | 28 | 26 | 0 | 0 | 1180 | 19 |
| E2 | 6.9 | 6.2 | 47 | 24 | 26 | 3 | 0 | 1245 | 12 |
| E3 | 7.2 | 6.3 | 48 | 23 | 27 | 2 | 0 | 1235 | 11 |
| E4 | 6.7 | 6.1 | 46 | 25 | 26 | 3 | 0 | 1230 | 9 |
| E5 | 2.3 | 2.4 | 100*1 | 0 | 0 | 0 | 0 | 745 | 16 |
| E6 | 3.2 | 1.9 | 88*1 | 4 | 0 | 8 | 0 | 885 | 13 |
| E7 | 2.7 | 2.6 | 48 | 21 | 21 | 10 | 0 | 1125 | 15 |
| E8 | 2.5 | 2.2 | 46 | 25 | 25 | 3 | 1 | 1180 | 16 |
| E9 | 2.7 | 2.0 | 49 | 29 | 0 | 0 | 22 | 810 | 16 |
| E10 | 5.9 | 5.3 | 48 | 24 | 26 | 2 | 0 | 1256 | 11 |
| E11 | 6.4 | 5.9 | 49 | 29 | 18 | 4 | 0 | 1289 | 12 |
| E12 | 2.9 | 2.3 | 52 | 28 | 18 | 2 | 0 | 1098 | 12 |
| E13 | 2.4 | 1.9 | 47 | 26 | 24 | 3 | 0 | 1003 | 13 |
| F1 | 2.8 | 2.5 | 48 | 22 | 26 | 4 | 0 | 1220 | 18 |
| F2 | 3.2 | 2.9 | 50 | 24 | 22 | 4 | 0 | 1215 | 17 |
| G1 | 2.1 | 1.9 | 48 | 25 | 26 | 1 | 0 | 1190 | 18 |
| G2 | 2.7 | 3.1 | 47 | 23 | 26 | 4 | 0 | 1220 | 16 |
| H1 | 4.2 | 3.8 | 46 | 26 | 27 | 1 | 0 | 1200 | 15 |
| H2 | 4.7 | 4.0 | 48 | 25 | 24 | 3 | 0 | 1220 | 14 |
| I1 | 4.6 | 3.9 | 49 | 23 | 27 | 1 | 0 | 1230 | 15 |
| I2 | 4.3 | 4.4 | 52 | 24 | 19 | 5 | 0 | 1245 | 12 |
| J1 | 3.9 | 4.1 | 47 | 29 | 22 | 2 | 0 | 1205 | 17 |
| J2 | 8.2 | 6.6 | 48 | 30 | 21 | 1 | 0 | 1195 | 13 |
| J3 | 7.2 | 6.4 | 50 | 28 | 20 | 2 | 0 | 1215 | 12 |
| J4 | 7.8 | 6.3 | 46 | 30 | 21 | 3 | 0 | 1200 | 13 |
| J5 | 3.9 | 3.9 | 48 | 27 | 22 | 3 | 0 | 1225 | 12 |
| J6 | 4.9 | 4.3 | 48 | 13 | 7 | 32 | 0 | 1345 | 9 |
| J7 | 4.4 | 4.5 | 47 | 31 | 20 | 2 | 0 | 1215 | 15 |
| J8 | 3.9 | 3.8 | 46 | 30 | 21 | 3 | 0 | 1205 | 16 |
| J9 | 4.3 | 3.6 | 47 | 23 | 0 | 2 | 30 | 910 | 16 |
| J10 | 9.4 | 7.5 | 46 | 32 | 20 | 2 | 0 | 1299 | 14 |
| J11 | 8.2 | 6.8 | 47 | 31 | 21 | 1 | 0 | 1258 | 15 |
| J12 | 2.8 | 2.1 | 46 | 32 | 20 | 2 | 0 | 1186 | 17 |
| J13 | 6.8 | 6.5 | 47 | 30 | 22 | 1 | 0 | 1245 | 15 |
| J14 | 6.1 | 5.3 | 47 | 31 | 21 | 1 | 0 | 1234 | 14 |
| J15 | 7.1 | 5.5 | 46 | 30 | 22 | 2 | 0 | 1306 | 8 |
| K1 | 2.7 | 1.0 | 46 | 26 | 25 | 3 | 0 | 1210 | 15 |
| L1 | 2.1 | 2.8 | 47 | 29 | 24 | 0 | 0 | 1180 | 17 |
| M1 | 2.0 | 2.1 | 46 | 26 | 25 | 3 | 0 | 1215 | 15 |
| N1 | 1.6 | 2.2 | 48 | 25 | 23 | 4 | 0 | 1225 | 14 |
| O1 | 1.8 | 2.6 | 42 | 28 | 25 | 5 | 0 | 1335 | 14 |
| O2 | 6.5 | 6.3 | 43 | 27 | 23 | 7 | 0 | 1345 | 8 |
| O3 | 7.1 | 6.1 | 41 | 28 | 27 | 4 | 0 | 1350 | 9 |
| O4 | 3.3 | 2.1 | 100*1 | 0 | 0 | 0 | 0 | 915 | 8 |
| O5 | 3.5 | 2.6 | 43 | 16 | 29 | 12 | 0 | 1455 | 9 |
| O6 | 2.6 | 2.8 | 42 | 27 | 27 | 4 | 0 | 1375 | 14 |
| O7 | 3.1 | 3.2 | 42 | 26 | 27 | 5 | 0 | 1380 | 15 |
| O8 | 1.9 | 2.8 | 43 | 29 | 23 | 5 | 0 | 1365 | 14 |
| O9 | 2.7 | 2.2 | 42 | 27 | 0 | 0 | 31 | 955 | 12 |
| O10 | 8.2 | 7.6 | 43 | 27 | 28 | 2 | 0 | 1409 | 13 |
| O11 | 1.7 | 1.3 | 43 | 28 | 27 | 2 | 0 | 1372 | 14 |
| O12 | 1.6 | 1.4 | 0 | 23 | 3 | 74 | 0 | 1763 | 4 |
| P1 | 2.2 | 2.4 | 43 | 27 | 26 | 4 | 0 | 1345 | 14 |
| Q1 | 2.4 | 2.1 | 42 | 28 | 27 | 3 | 0 | 1355 | 14 |
| R1 | 2.5 | 1.8 | 43 | 26 | 26 | 5 | 0 | 1325 | 13 |
| S1 | 1.6 | 2.2 | 41 | 33 | 26 | 0 | 0 | 1285 | 16 |
| a1 | 1.8 | 1.6 | 16 | 34 | 14 | 36 | 0 | 1675 | 4 |
| b1 | 2.3 | 2.3 | 84 | 7 | 9 | 0 | 0 | 585 | 34 |
| c1 | 1.7 | 3.0 | 88 | 0 | 0 | 0 | 12 | 535 | 29 |
| d1 | 2.3 | 2.2 | 92 | 0 | 0 | 9 | 8 | 525 | 30 |

TABLE 4-continued

| Steel type | ΔEl./% | TS × EL | Galvanizing fault | Fe %/Mass % | Steel sheet | Note |
|---|---|---|---|---|---|---|
| A1 | 1 | 25044 | ○ | 1.3 | GI | Present invention steel |
| A2 | 7 | 17910 | ○ | 2.0 | GI | Comparative steel |
| A3 | 6 | 16830 | ○ | 1.4 | GI | Comparative steel |
| A4 | 6 | 18360 | ○ | 2.1 | GI | Comparative steel |
| A5 | 7 | 16080 | ○ | 1.9 | GI | Comparative steel |
| A6 | 8 | 16660 | ○ | 2.3 | GI | Comparative steel |
| A7 | 1 | 13032 | ○ | 2.1 | GI | Comparative steel |
| A8 | 1 | 13975 | ○ | 2.2 | GI | Comparative steel |
| A9 | 0 | 23880 | X | 1.7 | GI | Comparative steel |
| A10 | 1 | 22885 | ○ | 11.6 | GA | Present invention steel |
| A11 | 0 | 20580 | ○ | 18.9 | GA | Comparative steel |
| A12 | 7 | 22572 | ○ | 10.2 | GA | Comparative steel |
| A13 | 6 | 21588 | ○ | 10.4 | GA | Comparative steel |
| A14 | 0 | 24192 | ○ | 9.6 | GA | Present invention steel |
| A15 | 6 | 22550 | ○ | 10.7 | GA | Comparative steel |
| A16 | 6 | 22660 | ○ | 10.3 | GA | Comparative steel |
| A17 | 6 | 15570 | ○ | 10.5 | GA | Comparative steel |
| A18 | 1 | 21482 | ○ | 11.2 | GA | Comparative steel |
| A19 | 1 | 17682 | ○ | 9.8 | GA | Comparative steel |
| A20 | 0 | 7546 | ○ | 9.9 | GA | Comparative steel |
| A21 | 6 | 21945 | ○ | 10.9 | GA | Comparative steel |
| A22 | 1 | 13273 | ○ | 13.4 | GA | Comparative steel |
| B1 | 1 | 23230 | ○ | 2.3 | GI | Present invention steel |
| C1 | 1 | 24000 | ○ | 2.2 | GI | Present invention steel |
| C2 | 7 | 17910 | ○ | 1.9 | GI | Comparative steel |
| C3 | 6 | 13345 | ○ | 2.2 | GI | Comparative steel |
| C4 | 6 | 11985 | ○ | 2.0 | GI | Comparative steel |
| C5 | 1 | 15470 | X | 1.6 | GI | Comparative steel |
| C6 | 0 | 21890 | ○ | 9.8 | GA | Present invention steel |
| C7 | 0 | 19665 | ○ | 12.2 | GA | Present invention steel |
| C8 | 1 | 14000 | X | 6.5 | GA | Comparative steel |
| C9 | 6 | 19988 | ○ | 10.4 | GA | Comparative steel |
| C10 | 1 | 22176 | ○ | 10.7 | GA | Present invention steel |
| C11 | 8 | 20862 | ○ | 11.3 | GA | Comparative steel |
| C12 | 0 | 17404 | ○ | 10.3 | GA | Comparative steel |
| C13 | 1 | 16380 | ○ | 10.9 | GA | Comparative steel |
| C14 | 0 | 8128 | ○ | 8.3 | GA | Comparative steel |
| C15 | 7 | 18462 | ○ | 9.8 | GA | Comparative steel |
| C16 | 0 | 13916 | ○ | 12.9 | GA | Comparative steel |
| D1 | 0 | 25610 | ○ | 1.7 | GI | Present invention steel |
| D2 | 1 | 24750 | ○ | 10.6 | GA | Present invention steel |
| E1 | 1 | 22420 | ○ | 2.3 | GI | Present invention steel |
| E2 | 6 | 14940 | ○ | 1.9 | GI | Comparative steel |
| E3 | 6 | 13585 | ○ | 1.5 | GI | Comparative steel |
| E4 | 8 | 11070 | ○ | 1.8 | GI | Comparative steel |
| E5 | 0 | 11920 | ○ | 2.2 | GI | Comparative steel |
| E6 | 0 | 11505 | ○ | 2.7 | GI | Comparative steel |
| E7 | 0 | 16875 | △ | 0.7 | GI | Comparative steel |
| E8 | 0 | 18880 | ○ | 10.6 | GA | Present invention steel |
| E9 | 1 | 12960 | ○ | 18.4 | GA | Comparative steel |
| E10 | 6 | 13816 | ○ | 8.8 | GA | Comparative steel |
| E11 | 6 | 15468 | ○ | 10.8 | GA | Comparative steel |
| E12 | 2 | 13176 | ○ | 9.1 | GA | Comparative steel |
| E13 | 2 | 13039 | ○ | 13.3 | GA | Comparative steel |
| F1 | 0 | 21960 | ○ | 2.4 | GI | Present invention steel |
| F2 | 0 | 20655 | ○ | 12.2 | GA | Present invention steel |
| G1 | 1 | 21420 | ○ | 2.1 | GI | Present invention steel |
| G2 | 1 | 19520 | ○ | 9.6 | GA | Present invention steel |
| H1 | 3 | 18000 | ○ | 1.7 | GI | Present invention steel |
| H2 | 4 | 17080 | ○ | 9.8 | GA | Present invention steel |
| I1 | 2 | 18450 | ○ | 2.4 | GI | Present invention steel |
| I2 | 3 | 18675 | ○ | 10.8 | GA | Present invention steel |
| J1 | 3 | 20485 | ○ | 1.7 | GI | Present invention steel |
| J2 | 8 | 15535 | ○ | 1.6 | GI | Comparative steel |
| J3 | 7 | 14580 | ○ | 2.3 | GI | Comparative steel |
| J4 | 6 | 15600 | ○ | 2.5 | GI | Comparative steel |
| J5 | 4 | 14700 | ○ | 1.9 | GI | Comparative steel |
| J6 | 3 | 12105 | ○ | 2.3 | GI | Comparative steel |
| J7 | 3 | 18225 | X | 2.4 | GI | Comparative steel |
| J8 | 4 | 19280 | ○ | 9.8 | GA | Present invention steel |
| J9 | 3 | 14560 | ○ | 17.4 | GA | Comparative steel |
| J10 | 9 | 18186 | ○ | 10.9 | GA | Comparative steel |
| J11 | 8 | 18870 | ○ | 10.5 | GA | Comparative steel |
| J12 | 2 | 20162 | ○ | 10.4 | GA | Present invention steel |
| J13 | 7 | 18675 | ○ | 10.3 | GA | Comparative steel |
| J14 | 6 | 17276 | ○ | 8.8 | GA | Comparative steel |
| J15 | 8 | 10448 | ○ | 9.3 | GA | Comparative steel |

TABLE 4-continued

| | | | | | | |
|---|---|---|---|---|---|---|
| K1 | 0 | 18150 | ○ | 2.1 | GI | Present invention steel |
| L1 | 1 | 20060 | ○ | 1.9 | GI | Present invention steel |
| M1 | 0 | 18225 | ○ | 2.2 | GI | Present invention steel |
| N1 | 1 | 17150 | ○ | 2.7 | GI | Present invention steel |
| O1 | 2 | 18690 | ○ | 1.9 | GI | Present invention steel |
| O2 | <u>6</u> | <u>10760</u> | ○ | 2.1 | GI | Comparative steel |
| O3 | <u>6</u> | <u>12150</u> | ○ | 2.2 | GI | Comparative steel |
| O4 | 1 | <u>7320</u> | ○ | 1.7 | GI | Comparative steel |
| O5 | 1 | <u>13095</u> | ○ | 1.6 | GI | Comparative steel |
| O6 | 0 | 19250 | <u>X</u> | 1.9 | GI | Comparative steel |
| O7 | 0 | 20700 | ○ | 8.9 | GA | Present invention steel |
| O8 | 1 | 19110 | ○ | 11.2 | GA | Present invention steel |
| O9 | 1 | <u>11460</u> | ○ | <u>18.9</u> | GA | Comparative steel |
| O10 | <u>7</u> | 18317 | ○ | 10.5 | GA | Comparative steel |
| O11 | 0 | 19208 | ○ | 10.1 | GA | Present invention steel |
| O12 | 1 | 7052 | ○ | 7.6 | GA | Present invention steel |
| P1 | 0 | 18830 | ○ | 2.2 | GI | Present invention steel |
| Q1 | 1 | 18970 | ○ | 1.7 | GI | Present invention steel |
| R1 | 0 | 17225 | ○ | 2.1 | GI | Present invention steel |
| S1 | 1 | 20560 | ○ | 1.6 | GI | Present invention steel |
| a1 | 0 | <u>6700</u> | ○ | <u>2.2</u> | GI | Comparative steel |
| b1 | 0 | 19890 | ○ | <u>1.6</u> | GI | Comparative steel |
| c1 | 0 | <u>15515</u> | ○ | <u>1.7</u> | GI | Comparative steel |
| d1 | 0 | <u>15750</u> | ○ | <u>2.0</u> | GI | Comparative steel |

F: ferrite,
B: bainite,
residual γ: residual austenite,
M: martensite,
P: pearlite
*1structure includes ferrite and carbide. However, the carbide was counted as ferrite.

INDUSTRIAL APPLICABILITY

The present invention is to provide the high-strength galvanized steel sheet having the small material anisotropy and excellent formability with the ultimate tensile strength of 980 MPa or more, which is suitable for the structural member, the reinforcing member, and the suspension member of automobiles, at a low cost. Accordingly, the present invention can be expected to greatly contribute to the lighter-weight of automobiles and is extremely high in effect in industry.

The invention claimed is:

1. A high-strength hot-dip galvanized steel sheet having small material anisotropy and excellent formability with an ultimate tensile strength of 980 MPa or more, the hot-dip galvanized steel sheet comprising a hot-dip galvanized layer formed on a surface of a base steel sheet,
wherein the base steel sheet contains: by mass %,
C: 0.1 to less than 0.40%;
Si: 0.5 to 3.0%;
Mn: 1.5 to 3.0%;
O: 0.0001 to 0.006%;
P: 0.0001 to 0.04%;
S: 0.0001 to 0.01%;
Al: 0.0005 to 2.0%;
N: 0.0005 to 0.01%; and
a balance including Fe and inevitable impurities,
a microstructure of the base steel sheet contains ferrite of 40% or more, contains residual austenite of 8 to 27%, by volume fraction, and contains bainite and a balance being martensite or less than 10% of pearlite,
an average value of pole densities of orientation groups {100} <011> to {223} <110> represented by each of crystal orientations {100} <011>, {116} <110>, {114} <110>, {113} <110>, {112} <110>, {335} <110>, and {223} <110> in a sheet thickness range of ⅝ to ⅜ from the surface of the base steel sheet is 6.5 or less and a pole density of a crystal orientation {332} <113> is 5.0 or less, and
the hot-dip galvanized layer contains Fe: less than 7 mass % and a balance including Zn, Al, and inevitable impurities.

2. The high-strength hot-dip galvanized steel sheet having the small material anisotropy and the excellent formability with the ultimate tensile strength of 980 MPa or more according to claim 1, wherein the base steel sheet further contains one or two or more of: by mass %,
Cr: 0.05 to 1.0%;
Mo: 0.01 to 1.0%;
Ni: 0.05 to 1.0%;
Cu: 0.05 to 1.0%;
Nb: 0.005 to 0.3%;
Ti: 0.005 to 0.3%;
V: 0.005 to 0.5%; and
B: 0.0001 to 0.01%.

3. The high-strength hot-dip galvanized steel sheet having the small material anisotropy and the excellent formability with the ultimate tensile strength of 980 MPa or more according to claim 1, wherein the base steel sheet further contains, by mass %, 0.0005 to 0.04% in total of one or two or more selected from Ca, Mg, and REM.

4. A high-strength alloyed hot-dip galvanized steel sheet having small material anisotropy and excellent formability with an ultimate tensile strength of 980 MPa or more, the alloyed hot-dip galvanized steel sheet comprising an alloyed hot-dip galvanized layer formed on a surface of a base steel sheet,
wherein the base steel sheet contains: by mass %,
C: 0.10 to less than 0.4%;
Si: 0.5 to 3.0%;
Mn: 1.5 to 3.0%;
O: 0.0001 to 0.006%;
P: 0.0001 to 0.04%;
S: 0.0001 to 0.01%;

Al: 0.0005 to 2.0%;
N: 0.0005 to 0.01%; and
a balance including Fe and inevitable impurities,
a microstructure of the base steel sheet contains ferrite of 40% or more, contains residual austenite of 8 to 27%, by volume fraction, and contains bainite and a balance being martensite or less than 10% of pearlite,
an average value of pole densities of orientation groups {100} <011> to {223} <110> represented by each of crystal orientations {100} <011>, {116} <110>, {114} <110>, {113} <110>, {112} <110>, {335} <110>, and {223} <110> in a sheet thickness range of ⅝ to ⅜ from the surface of the base steel sheet is 6.5 or less and a pole density of a crystal orientation {332} <113> is 5.0 or less, and
the alloyed hot-dip galvanized layer contains Fe: 7 to 15 mass % and a balance including Zn, Al, and inevitable impurities.

5. The high-strength alloyed hot-dip galvanized steel sheet having the small material anisotropy and the excellent formability with the ultimate tensile strength of 980 MPa or more according to claim 4, wherein the base steel sheet further contains one or two or more of: by mass %,
Cr: 0.05 to 1.0%;
Mo: 0.01 to 1.0%;
Ni: 0.05 to 1.0%;
Cu: 0.05 to 1.0%;
Nb: 0.005 to 0.3%;
Ti: 0.005 to 0.3%;
V: 0.005 to 0.5%; and
B: 0.0001 to 0.01%.

6. The high-strength alloyed hot-dip galvanized steel sheet having the small material anisotropy and the excellent formability with the ultimate tensile strength of 980 MPa or more according to claim 4, wherein the base steel sheet further contains, by mass %, 0.0005 to 0.04% in total of one or two or more selected from Ca, Mg, and REM.

* * * * *